3,396,171
2:3:4:5-TETRAHYDRO-1:4-METHANO-
1H-3-BENZAZEPINS
Karl Schenker, Basel, Switzerland, assignor to Ciba Corporation, New York, N.Y., a corporation of Delaware
No Drawing. Filed May 21, 1965, Ser. No. 457,858
Claims priority, application Switzerland, June 10, 1964,
7,584/64; Apr. 28, 1965, 5,888/65
19 Claims. (Cl. 260—326.3)

ABSTRACT OF THE DISCLOSURE

Compounds of the formula

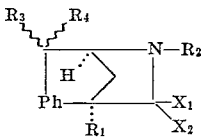

in which

Ph is an optionally substituted ortho-phenylene radical.
$R_1$ is hydrogen or an optionally substituted hydrocarbon radical.
$R_2$ is hydrogen or an optionally substituted hydrocarbon radical.
$R_3$ and $R_4$ together represent an oxo group or $R_3$ is hydrogen and $R_4$ is hydrogen or a free, etherified or esterified hydroxyl group or $R_3$ is an optionally substituted hydrocarbon radical and $R_4$ a free, etherified or acylated hydroxyl group.
$X_1$ and $X_2$ each is a hydrogen atom or may stand together for an oxo group, in the free form or in the form of their salts, e.g., the 1-phenyl-3-methyl-2,3,4,5-tetrahydro-1,4-methano-1H-3-benzazepine.
Use: Starting materials and diuretic or analgetic agents.

Summary of the invention

The present invention relates to new benzazepines. Especially it concerns 2:3:4:5-tetrahydro-1:4-methano-1H-3-benzazepines having the following basic structure:

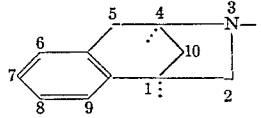

which are in the 1-position unsubstituted or substituted by an optionally substituted hydrocarbon radical, unsubstituted in the 2-position or contain an oxo group, are unsubstituted in the 3-position or are substituted by an optionally substituted hydrocarbon radical, are unsubstituted in the 4-position, contain in the 5-position an oxo group or two hydrogen atoms or one hydrogen atom and a free, etherified or esterified hydroxyl group, or an optionally substituted hydrocarbon radical and a free, etherified or acylated hydroxyl group, and in the 6-, 7-, 8- and 9-positions are substituted or unsubstituted, and their salts.

Examples of substituents in the 1-position are: alkyl radicals, for example, lower alkyl radicals such as methyl, ethyl, propyl or isopropyl radicals, straight-chain or branched butyl, pentyl, or hexyl radicals bound in any position, aryl or aralkyl radicals such as phenyl or phenyl-lower alkyl radicals, for example, benzyl- or 1- or 2-phenyl-ethyl radicals, which may be substituted in their aromatic nuclei by, for example, lower alkyl groups, for example, the above-mentioned, lower alkoxy groups, halogen atoms and/or trifluoromethyl groups. Lower alkoxy groups, are, in particular, methoxy, ethoxy, propoxy or butoxy groups. The halogen atoms are, above all, chlorine or bromine atoms.

The substituents in 3-position are, above all, saturated or unsaturated aliphatic, cycloaliphatic or cycloaliphatic-aliphatic hydrocarbon radicals or araliphatic or aromatic hydrocarbon radicals such as the above-mentioned alkyl, aryl or aralkyl radicals, or cycloalkyl or cycloalkyl-lower alkyl radicals, such as cyclopentyl, cycloheptyl radicals or cyclopropyl-, cyclobutyl-, cyclopentyl-, cyclohexyl-methyl, -ethyl, -propyl or -butyl radicals or alkenyl radicals, such as allyl, methallyl or 3-methyl-2-butenyl radicals.

As optionally substituted hydrocarbon radicals in the 5-position especially the aforementioned come into consideration.

The etherified hydroxyl groups are, above all, hydroxyl groups substituted by aliphatic or araliphatic radicals. There may be mentioned, for example, lower alkoxy groups, for example, the above-mentioned alkoxy groups, lower alkenyloxy groups, for example, allyloxy, phenyl-lower alkoxy groups such as benzyloxy, 1- or 2-phenyl-ethoxy groups in which the aromatic radicals may also contain substituents, for example, lower alkyl groups, lower alkoxy groups, halogen atoms or trifluoromethyl groups.

Esterified hydroxyl groups are, for example, hydroxyl groups esterified with inorganic acids, for example, hydrohalic acids, for example, chlorine or bromine atoms, or hydroxyl groups esterified with organic acids, especially acylated hydroxyl groups.

Acylated hydroxyl groups are more especially carbamoyloxy groups, for example lower alkylcarbamoyloxy groups, such as methyl-, ethyl-, propyl- or butyl-carbamoyloxy groups or particularly lower alkanoyloxy groups, such as acetoxy, propionyloxy or butyryloxy groups or benzoyloxy groups.

As substituents of the aromatic ring (positions 6, 7, 8 and 9) there come into consideration, for example, lower alkyl groups, lower alkoxy groups, hydroxy groups, acyloxy groups, halogen atoms, particularly those mentioned above, or trifluoromethyl groups.

The present invention provides a process for the manufacture of the new compounds, wherein a 4-oxo-1:2:3:4-tetrahydronaphthalene-1-carboxylic acid amide, which contains a halogen atom in 3-position, especially a chlorine, bromine or an iodine atom and whose amide nitrogen atom carries at least one hydrogen atom, is condensed intramolecularly and, if desired, substituents are introduced into the compounds thus obtained or substituents in the said compounds are modified or split off.

The intramolecular condensation (ring closure) is advantageously carried out in the presence of basic condensing agents, for example, alkali hydroxides, for example, sodium or potassium hydroxide, alkali alcoholates, for example, sodium or potassium ethylate or methylate, and in the presence of solvents and/or diluents, for example, water or organic solvents, for example, alcohols, for example, lower alkanols such as methanol or ethanol, at room temperature, at a temperature below room temperature or at an elevated temperature.

Groups in the new products thus obtained may be modified or split off by known methods, or new groups may be introduced into the compound by known methods.

For example, compounds obtained having a hydrogen atom in 3-position and an oxo group in 2-position may be substituted in 3-position, for example, by reaction with reactive esters of alcohols, for example, alkanols, alkenols, cycloalkanols, cycloalkyl-alkanols, or aralkanols. Reactive esters are, for example, esters with strong inorganic or organic acids, advantageously hydrohalic acids such as hydrochloric, hydrobramic or hydroiodic acid, or with aryl or alkyl sulfonic acids such as benzene-, para-bromobenzene- or para-toluene-sulfonic acids. The reaction is carried out in the customary manner at room temperature, at a temperature lower than room temperature or at an elevated temperature advantageously in the presence of basic condensing agents, especially strong bases such as alkali metal alcoholates, hydrides or amides and in the presence of solvents and/or diluents.

Furthermore, oxo groups in 5-position may be reduced to hydroxyl groups by known methods, if desired, with the introduction, in 5-position, of a hydrocarbon radical that may be substituted. Reduction of the oxo group is carried out in the customary manner, for example, by reduction with complex metal hydrides, for example, sodium boron hydride or lithium-aluminum hydride, or by hydrogen in the presence of a hydrogenation catalyst, for example, a platinum, nickel or copper catalyst such as platinum oxide, Raney nickel or copper chromite. The reaction is carried out at low temperature, room temperature or an elevated temperature in an open vessel or in a vessel under pressure, advantageously in the presence of a diluent and/or solvent.

When the oxo group in 5-position is to be reduced with simultaneous introduction of a hydrocarbon radical that may be substituted at 5-position to the hydroxyl group, the reaction is carried out, for example, with a reagent of the formula $R_0^{\ominus}M^{\oplus}$, in which $R_0$ represents a hydrocarbon radical that may be substituted and $M^{\oplus}$ represents the cation of lithium, or the group of the formula hal-$Mg^{\oplus}$, in which hal represents a halogen atom, for example, chlorine, bromine or iodine. The reaction is carried out in the customary manner in the presence of an ether, for example, diethyl ether or tetra-hydrofuran.

Catalytic reduction of the oxo group in 5-position yields predominantly 5$\beta$-hydroxyl compounds. When the oxo group in 5-position is reduced with complex light-metal hydrides, a mixture of the 5$\alpha$-hydroxy compound and the 5$\beta$-hydroxy compound is obtained. When the oxo group is reduced with the introduction of a hydrocarbon radical, for example, by means of a Grignard compound, the compounds obtained are predominantly the 5$\beta$-hydroxy compounds that contain the hydrocarbon radical in 5$\alpha$-position.

Furthermore, a keto group in 2-position may be reduced in the usual manner to a methylene group. This reduction may be effected, for example, by lithium aluminum hydride.

Compounds that are unsubstituted in 3-position and that do not contain an oxo group in 2-position may be substituted in the usual manner, for example by reaction with reactive esters of alcohols such as alkanols, cycloalkanols, cycloalkyl-alkanols, alkenols or aralkanols, for example, those mentioned above, or by reductive alkylation, that is to say, by reaction with an appropriate oxo compound and subsequent or simultaneous reduction.

A further possibility for the substitution in the 3-position consists in reaction with an acylating agent and reducing the resulting 3-acyl compound, for example, with lithium-aluminumhydride. As acylating agent a carboxylic acid halide or anhydride may be used, for example a pure or mixed anhydride or inner anhydride, such as a ketene.

Free hydroxyl groups in the compounds obtained may be esterified or etherified. Etherification may be carried out, for example, by reaction with a reactive ester of an alcohol, for example, one of the above-mentioned esters, advantageously in the presence of a strong base, or by treatment with a trialkyloxonium fluoroborate, such as trimethyloxonium fluoborate.

Esterification of the hydroxyl groups in the 5, 6, 7, 8 or 9-position with organic acids, may be carried out, for example, by reaction with the appropriate acid halide or anhydride, for example a pure or mixed anhydride or inner anhydride, such as a ketene or isocyanate.

The esterification of the hydroxy groups in the 5-position of compounds which contain in addition to the hydroxy group in the 5-position a hydrogen atom, with inorganic acids, for example with hydrohalic acids, may be carried out, for example, by reaction with the appropriate acid, if desired in the presence of a catalyst, or by treatment with a halide of sulfur or phosphorus, such as thionyl chloride, phosphorus pentachloride, phosphorus oxychloride or phosphorus tribromide.

In compounds containing acyloxy groups the acyl groups may be eliminated in a known manner by hydrolysis or by reduction with lithium aluminum hydride.

In the case of compounds that contain a hydrogen atom and a halogen atom in the 5-position, the said halogen atom may be replaced by a hydrogen atom by hydrogenolysis or reduction, for example, with catalytically activated hydrogen or with complex light-metal hydrides.

In compounds containing etherified hydroxy groups, for example at the aromatic ring, the latter may be converted into free hydroxy groups in the customary manner by hydrolysis, for example with the aid of hydrobromic or hydriodic acid In the case of compounds that are unsubstituted in 2-position and that contain an $\alpha$-aralkyl radical in 3-position, for example, a benzyl radical, the said radical may be split off in a customary manner by hydrogenolysis, that is to say, by treatment with hydrogen in the presence of a hydrogenation catalyst, for example, a palladium catalyst.

The above-mentioned reactions are carried out in the usual manner in the presence or absence of diluents condensing agents and/or catalysts at low temperature, room temperature or elevated temperature, if desired or required in a closed vessel and/or in an inert gas atmosphere.

If desired or required, the aforementioned conversions may be combined in different ways. Advantageously, however, the procedure is to condense a 3-halogen-4-oxo-1:2:3:4-tetrahydronaphthalene - 1 - carboxylic acid amide, whose amide nitrogen atom carries at least one hydrogen atom, intramolecularly, and to reduce the oxo group in 5-position in the compound obtained to a hydroxyl group, if desired or required after substitution in 3-position, to reduce the keto group in 2-position to the methylene group and, if desired, to substitute the compounds obtained in 3-position and/or at the hydroxyl group in 5-position, or to condense a 3-halogen-4-oxo-1:2:3:4-tetrahydronaphthalene-1-carboxylic acid amide, whose amide nitrogen atom carries at least one hydrogen atom, intramolecularly and to reduce the oxo group in 5-position in the compound thus obtained to a hydroxyl group, if desired, after substitution in 3-position, with introduction of a hydrocarbon radical that may be substituted, to reduce the keto group in 2-position to a methylene group and, if desired, substitute the compounds obtained in 3-position and/or at the hydroxyl group in 5-position, and/or split off a benzyl group in 3-position by hydrogenolysis.

A further advantageous reaction sequence is to condense a 3-halogen-4-oxo-1:2:3:4-tetrahydronaphthalene-1-carboxylic acid amide, whose amide nitrogen atom carries at least one hydrogen atom, intramolecularly and to reduce the oxo group in 5-position in the compound thus obtained to a hydroxyl group, if desired, after substitution in 3-position, to convert the hydroxyl group into a halogen atom, to convert the halogen atom into a hydrogen atom by reduction, to reduce the keto group in 2-position to a methylene group and, if desired, substitute the compounds obtained in 3-position.

The new compounds, which contain an asymmetric carbon atom in 5-position, may be racemate mixtures, pure racemates or optical antipodes. If a carbon atom in 5-position has two identical substituents, they may be pure racemates or optical antipodes. The substituent in 5-position, which is in syn-position to the methano bridge may be said to be in a $\alpha$-position, and the substituent in anti-position to the methano bridge may be said to be in β-position.

Because of the physicochemical differences between the constituents, racemate mixtures may be separated in known manner into the two stereoisomeric pure racemates, for example, by chromatography and/or fractional crystallization.

Racemic products can also be resolved into the optical antipodes by known methods, for example, as follows: the racemic bases, dissolved in a suitable inert solvent, are reacted with an optically active acid, and the salts obtained are separated into the diastereoisomers, for example, by reason of their different solubilities, from which the antipodes of the new bases can be liberated by the action of an alkaline agent. The optically active acids generally used are d-tartaric acid and l-tartaric acid, di-ortho-toluyl tartaric acid, malic acid, mandelic acid, comphor-sulfonic acid and quinic acid. Optically active forms of the above-mentioned compounds may also be obtained with the aid of biochemical methods. Separation can also be achieved by recrystallizing the pure racemate obtained from a suitable optically active solvent.

The compounds unsubstituted in 2-position are obtained in the free form or in the form of their salts, which are also included in the invention, depending on the conditions under which the process is carried out and on the starting materials used. Salts that are obtained can be converted into the free bases in known manner, for example, by a treatment with alkalis or ion exchangers. Free bases that are obtained can be converted into salts by reaction with organic or inorganic acids, especially those that are suitable for the formation of therapeutically useful salts. Such acids are, for example, hydrohalic acids, sulfuric acids, phosphoric acids, nitric acid, perchloric acid; aliphatic, alicyclic, aromatic or heterocyclic carboxylic or sulfonic acids, for example, formic acid, acetic acid, propionic acid, succinic acid, glycollic acid, lactic acid, malic acid, tartaric acid, citric acid, ascorbic acid, maleic acid, hydroxymaleic acid and pyroracemic acid; phenylacetic acid, benzoic acid, para-aminobenzoic acid, anthranilic acid, para-hydroxybenzoic acid, salicylic acid, para-aminosalicylic acid, embonic acid, methane sulfonic acid, ethane sulfonic acid, hydroxyethane sulfonic acid, ethylene sulfonic acid; halogenbenzene sulfonic acid, toluene sulfonic acid, naphthalene sulfonic acids and sulfanilic acid; methionine tryptophane, lysine or arginine.

These or other salts of the new compounds, for example, the picrates, can also be used for purification of the free bases obtained; the free bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process in which an intermediate product obtainable at any stage of the process is used as starting material and any remaining steps are carried out, or the process is discontinued at any stage thereof, or in which the starting material is formed under the reaction conditions, or in which the reaction components may be present in the form of their salts.

For example, a 4-oxo-1:2:3:4-tetrahydronaphthalene-1-carboxylic acid amide can be halogenated in a basic medium, for example, in the presence of strong bases such as alkali hydroxides or alkali alcoholates to form the intermediate product 3-halogen-1:2:3:4-tetrahydronaphthalene-1-carboxylic acid amide, which is condensed intramolecularly by the action of the base that is present.

The starting materials are known or can be obtained by methods in themselves known.

The new compounds are valuable intermediate products suitable for use in the manufacture of pharmacologically active compounds.

The compounds unsubstituted in 2-position defined above possess valuable pharmacological properties. In particular, they exhibit diuretic and saliuretic activity, which can be proved, for example, by tests on animals, for example, by oral administration to rats. Furthermore, they have an analgetic activity, for example in animal experiments, for example in the mouse, and are morphine-antagonists, as has been shown in experimental animals, for example in the rabbit. In addition they have a hypotensive effect. The aforesaid compounds may be used as diuretics, analgesics or hypotensives.

Compounds deserving special mention because of their diuretic activity are those of the formula

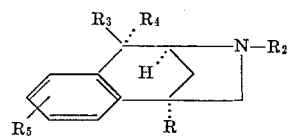

in which $R_1$ represents a lower alkyl radical or a phenyl or phenyl-lower-alkyl radical which may be substituted, for example, as indicated above, $R_2$ represents a hydrogen atom or a lower alkyl radical or a phenyl lower-alkyl radical, one of the radicals $R_3$ and $R_4$, especially $R_3$, represents a hydrogen atom or a free, etherified or acylated hydroxyl group and the other radical represents a hydrogen atom or a lower alkyl radical or a phenyl radical that may be substituted, for example, as indicated above, and $R_5$ represents a hydrogen atom or a lower alkyl radical or a lower alkoxy group or a halogen atom or a trifluoromethyl radical, and especially the compounds of the above formula in which $R_1$ represents a lower alkyl radical, $R_2$ represents a hydrogen atom or a lower alkyl radical, one of the radicals $R_3$ and $R_4$, especially $R_3$, represents a hydrogen atom or a free, etherified or acylated hydroxyl group and the other radical represents a hydrogen atom or a lower alkyl radical or a phenyl radical, and $R_5$ represents a hydrogen atom or a lower alkoxy group or a lower alkyl group or a halogen atom or a trifluoromethyl radical.

Compounds that are specially active are 1-ethyl-3-(n-butyl)-5β-acetoxy-2:3:4:5-tetrahydro-1:4-methano-1H-3-benzazepine, 1-ethyl-3-methyl-5α-methyl-5β-hydroxy-2:3:4:5-tetrahydro-1:4-methano-1H-3-benzazepine and 1-ethyl-3-methyl-5α-phenyl-5β-hydroxy-8-methoxy-2:3:4:5-tetrahydro-1:4-methano-1H-3-benzazepine.

Special mention on account of their analgesic effect may be made of the compounds of the formula

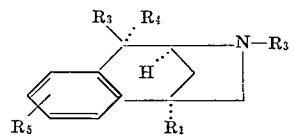

in which $R_1$ represents a lower alkyl radical or more especially an optionally substituted phenyl radical, for example as shown above, $R_2$ represents a hydrogen atom, a lower alkyl radical, a phenyl-lower alkyl radical or more especially a lower alkenyl radical or a cycloalkyl-lower alkyl radical, $R_3$ and $R_4$ represent two hydrogen atoms or a hydrogen atom and a free, lower alkylated, lower alkanoylated or lower alkylcarbamoylated hydroxy group and $R_5$ represents a hydrogen atom, a lower alkyl radical, a lower alkoxy radical, a halogen atom or a trifluoromethyl group, a hydroxy group or a lower alkanoyloxy group.

Especially active are the following:

1-ethyl-3-phenylethyl-2:3:4:5-tetrahydro-1,4-methano-1H-3-benzazepine, 1-ethyl-3-phenylethyl-8-methoxy-2:3:4:5-tetrahydro-1,4-methano-1H-3-benzazepine, 1-ethyl-3-methyl-8-acetoxy-2:3:4:5-tetrahydro-1,4-methano-1H-3-benzazepine and particularly 1-phenyl-3-methyl-2:3:4:5-tetrahydro-1,4-methano-1H-3-benzazepine.

The reactions of the invention are advantageously carried out with those starting materials that lead to the production of the compounds described above as deserving special mention.

The pharmacologically active compounds can be used in the free form or in the form of their therapeutically acceptable salts for the manufacture of pharmaceutical preparations containing the said compounds in admixture or conjunction with organic or inorganic, solid or liquid pharmaceutical excipients suitable for enteral, parenteral or topical application. Suitable excipients are substances that do not react with the new compounds, for example, water, gelatine, lactose, starch, stearyl alcohol, magnesium stearate, talc, vegetable oils, benzyl alcohols, gums, propylene glycols, white petroleum jelly, cholesterol and other know medicinal excipients. The pharmaceutical preparations may be, for example, tablets, dragees, capsules, salves or creams, or in liquid form as solutions, suspensions or emulsions. They may be sterilized and/or contain assistants such as preserving, stabilizing, wetting or emulsifying agents, salts for regulating the osmotic pressure or buffers. They may further contain other therapeutically valuable substances. The pharmaceutical preparations are prepared by conventional methods.

The active compounds may also be used, for example, in the form of animal feedstuff or as additives for animal feedstuffs. The usual extending agents and diluents are used or the usual feedstuffs.

The following examples illustrate the invention.

Example 1

304 grams (1.4 mol) of 1-ethyl-4-oxo-1:2:3:4-tetrahydronaphthalene-1-carboxylic acid amide are suspended in a solution of 350 grams of solid sodium hydroxide in 2800 milliliters of water. 290 grams (=91.7 ml.; 1.8 mol) of bromine are slowly added, dropwise, at a temperature of —5 to +10° C. while stirring vigorously. Stirring is continued for a further 10 hours, the reaction mixture being allowed gradually to reach room temperature. The suspension is maintained throughout the course of the reaction. The reaction mixture is then suction-filtered and the filter residue is washed with a large quantity of water until the washings react virtually neutral. The filtered material is dried at 80° C. in a water-jet vacuum, digested for 30 minutes with 450 milliliters of boiling ethyl acetate and then filtered at 40° C. 1-ethyl-2:5-dioxo-2:3:4:5-tetrahydro-1:4-methano-1H-3-benzazepine of the formula

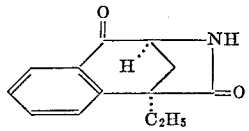

melting at 205 to 210° C. is obtained. After recrystallization from ethyl acetate the product melts at 211 to 213° C.

Example 2

4.6 grams (0.2 mol) of sodium are dissolved in 200 milliliters of absolute methanol. 14.8 grams (0.05 mol) of 1-ethyl-3-bromo-4-oxo-1:2:3:4-tetrahydronaphthalene-1-carboxylic acid amide are added in portions within a short time while stirring vigorously. During this process the temperature of the reaction mixture rises from 22° C. to 27° C. and the 1-ethyl-3-bromo-4-oxo-1:2:3:4-tetrahydronaphthalene-1-carboxylic acid amide dissolves rapidly.

After a short time, colorless crystals precipitate. The batch is concentrated to half its volume and is then cautiously diluted with 250 milliliters of water. After cooling to 0° C., 1-ethyl-2:5-dioxo-2:3:4:5-tetrahydro-1:4-methano-1H-3-benzazepine of the formula

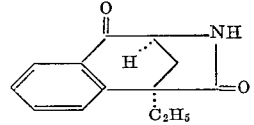

melting at 208 to 210° C. is obtained. Its infra-red spectrum and mixed melting point show it to be identical with the product obtained in Example 1.

The 1-ethyl-3-bromo-4-oxo-1:2:3:4-tetrahydronaphthalene-1-carboxylic acid amide used as starting material can be prepared as follows:

43.4 grams (0.2 mol) of 1-ethyl-4-oxo-1:2:3:4-tetrahydronaphthalene-1-carboxylic acid amide are dissolved in 140 milliliters of glacial acetic acid, and then 32.0 grams (=10.2 ml. =0.2 mol) of bromine are added at 20° C. After a short time the solution loses its color and at the same time heats up; it is then immediately evaporated in a water-jet vacuum. The oily residue is digested with 100 milliliters of ethyl acetate, whereby it crystallizes completely. Suction-filtration yields 1-ethyl-3-bromo-4-oxo-1:2:3:4-tetrahydronaphthalene-1-carboxylic acid amide of the formula

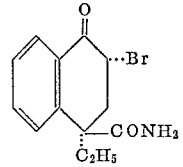

melting at 159 to 160° C. (with decomposition).

One recrystallization from chloroform yields colorless crystals melting at 163 to 165° C. (with decomposition).

Example 3

15.0 grams (0.65 mol) of sodium are dissolved in 500 milliliters of methanol. 99.3 grams (0.304 mol) of 1-ethyl-3-bromo-4-oxo-7-methoxy - 1:2:3:4 - tetrahydronaphthalene-1-carboxylic acid amide are added in portions at 18° C. in the course of 15 minutes while being stirred vigorously. The temperature of the reaction mixture rises to approximately 35° C. and, after a short time, the 1-ethyl-3-bromo-4-oxo - 7 - methoxy - 1:2:3:4 - tetrahydronaphthalene-1-carboxylic acid amide dissolves completely. The batch is allowed to react for 1 hour at room temperature, and the 800 milliliters of water are allowed slowly to run into the flask. The 1-ethyl-2:5-dioxo-8-methoxy-2:3:4:5-tetrahydro-1:4-methano-1H-benzazepine of the formula

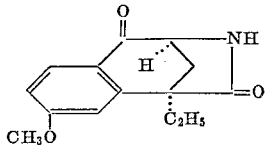

precipitates out in the form of green-grey cubes melting at 156 to 158° C.

The product is purified by recrystallization from ethyl acetate, whereby pale green crystals melting at 166 to 167° C. are obtained.

The 1 - ethyl - 3 - bromo - 4 - oxo-7-methoxy-1:2:3:4-tetrahydronaphthalene-1-carboxylic acid amide used as starting material can be prepared as follows:

49.4 grams (0.2 mol) of 1 - ethyl - 4 - oxo-7-methoxy-1:2:3:4-tetrahydronaphthalene-1-carboxylic acid amide are dissolved at 40° C. in 200 milliliters of glacial acetic acid, and then 10.5 milliliters (0.206 mol) of bromine are allowed to run into the solution fairly quickly while stirring. The color of the bromine disappears immediately. The glacial acetic acid is evaporated in a water-jet vacuum, and the oily residue is dissolved quickly in 100 milliliters of ethyl acetate. As soon as crystallization has started, the mass is diluted slowly with a total amount of 250 milliliters of ether, the rate at which the ether is added depending on the rate at which crystallization proceeds. After cooling in ice water, yellow to brownish colored 1 - ethyl-3-bromo-4-oxo-7-methoxy-1:2:3:4-tetrahydro-1-carboxylic acid amide of the formula

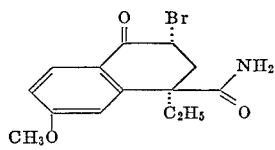

melting at 155 to 158° C. (with decomposition) is obtained. The compound melts at 167° C. after recrystallization from ethyl acetate.

Example 4

17.6 grams (0.765 mol) of sodium are dissolved in 750 milliliters of absolute methanol. The solution is cooled to 15° C. and 92.7 grams (0.27 mol) of 1-phenyl-3-bromo-4 - oxo-1:2:3:4-tetrahydronaphthalene-1-carboxylic acid amide are added in portions in the course of 5 minutes, while stirring. After a short time, the bromine compound dissolves and the temperature rises to 28 to 30° C. Stirring is continued for a further 60 minutes, whereby the product begins to precipitate in the form of crystals. The reaction mixture is cooled to 0° C., and 200 milliliters of water are added. The crystalline product is isolated by suction filtration and washed well with water. Drying at 70° C. in a water-jet vacuum yields 1-phenyl-2:5-dioxo-2:3:4:5-tetrahydro-1:4-methano-1H-3-benzazepine of the formula

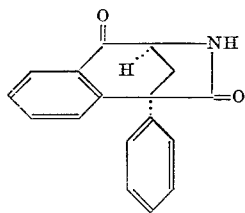

in the form of pale green crystals melting at 207 to 210° C. Colorless cubes melting at 209 to 211° C. are obtained after recrystallization from a mixture of chloroform and ether.

The 1-phenyl-3-bromo-4-oxo-1:2:3:4-tetrahydronaphthalene-1-carboxylic acid amide used as starting material was prepared as follows:

96.5 grams (0.5 mol) of diphenylacetonitrile and 60 grams (0.6 mol) of acrylic acid ethyl ester are dissolved in 200 milliliters of tetrahydrofuran, and 3 portions of 2 milliliters each of a 40% solution of triethylbenzylammonium hydroxide in tertiary butanol are added. When the exothermic reaction has subsided, the batch is heated for 2 hours at the boil. The solvent is evaporated off, the residue is dissolved in chloroform and then extracted once with 50 milliliters of 2 N hydrochloric acid and twice with water. The chloroform solution is dried over sodium sulfate and evaporated. Fractional distillation of the residue in high vacuum yields γ:γ-diphenyl-γ-cyanobutyric acid ethyl ester boiling at 145 to 160° C. under a pressure of 0.20 millimeters of Hg.

146.5 grams (0.5 mol) of γ:γ-diphenyl-γ-cyano-butyric acid ethyl ester are dissolved in 700 milliliters of methanol, and the solution is added to 300 milliliters of 2 N aqueous sodium hydroxide, solution in portions and slowly enough to ensure that the solution always remains clear. The solution is heated for a short time on a water bath, 800 milliliters of water are added, and the batch is allowed to stand for 12 hours at 25° C. A small amount of diphenylacetonitrile crystallizes out and is filtered off.

The filtrate is acidified with 5 N hydrochloric acid, whereby the γ:γ-diphenyl-γ-cyanobutyric acid crystallizes out. The batch is cooled to 5° C., the acid is isolated by filtration and then washed well with water. After drying for 1 day at 80° C. under a pressure of 100 millimeters of mercury, the acid is obtained in the form of a colorless crystalline powder melting at 157 to 160° C. A test portion melts at 160 to 161° C. after recrystallization from a mixture of ethyl acetate and petroleum ether.

132.5 grams (0.5 mol) of γ:γ-diphenyl-γ-cyanobutyric acid are introduced in portions into 450 milliliters of sulfuric acid of 100% strength in the course of 1 hour, while stirring. The acid dissolves slowly and the temperature of the reaction mixture rises to 45° C. The clear, fluorescent solution is allowed to stand for 24 hours at 25° C., and is then introduced into 3 liters of ice water while stirring. During this process, 1 - phenyl - 4 - oxo-1:2:3:4 - tetrahydronaphthalene-1-carboxylic acid amide crystallizes out. The batch is cooled to +5° C., the crystalline product is isolated by suction-filtration and then washed well with water. The still moist filter cake is dissolved in 500 milliliters of chloroform, the chloroform solution is separated from the water and dried over sodium sulfate. When the solvent has been evaporated off, 1 - phenyl-4-oxo-1:2:3:4 - tetrahydronaphthalene-1-carboxylic acid amide melting at 185 to 186° C. remains. A test portion recrystallized from ethyl acetate yields colorless crystals melting at 187° C.

87.0 grams (0.33 mol) of 1-phenyl-4-oxo-1:2:3:4-tetrahydronaphthalene-1-carboxylic acid amide are dissolved at 50° C. in 350 milliliters of glacial acetic acid, 1 milliter of a 30% solution of hydrogen bromide in glacial acetic acid is added and then 55.4 grams (0.346 mol) of bromine are added to the solution dropwise while stirring vigorously. The reaction temperature is kept below 60° C. by cooling with water. The color of the bromine disappears immediately. The clear solution is evaporated in vacuo and the residue is recrystallized from a mixture of ethyl acetate, ether and petroleum ether. 1-phenyl-3-bromo-4-oxo-1:2:3:4 - tetrahydronaphthalene-1-carboxylic acid amide of the formula

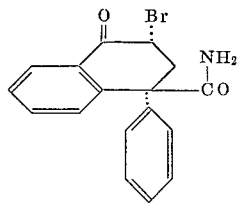

is obtained in the form of colorless granular crystals melting at 178 to 181° C.

Example 5

35.2 grams (0.1 mol) of 1-ethyl-3-bromo-4-oxo-1:2:3:4-tetrahydronaphthalene-1-carboxylic acid-n-butyl-amide are dissolved in 150 milliliters of absolute methanol, and the solution is allowed to run into a solution of 9.2 grams (0.4 mol) of sodium in 150 milliliters of absolute methanol at 20° C. The solution is stirred for 1 hour at 20° C. and is then heated for a further hour at 50° C. The solution is cooled, rendered slightly acid by the addition to dilute hydrochloric acid, 200 milliliters of water are added and the solution is then extracted with choloroform. The oil that remains (25.2 grams) after the chloroform has been distilled off is dissolved in 100 milliliters of methanol, 35 milliliters of 2 N aqueous sodium hydroxide solution are added and the batch is allowed to stand for 2 hours at 25° C. 200 milliliters of water are added and the batch is extracted 3 times with 100 milliliters of chloroform each time. The united chloroform extracts are washed with 100 milliliters of water, dried over sodium sulfate and evaporated. The residue is chromatographed on 300 grams of alumina (containing 2% of water). Benzene elution yields 1-ethyl-2:5-dioxo- 3 - (n-butyl)-2:3:4:5-tetrahydro-1:4-methano-1H-3-benzazepine of the formula

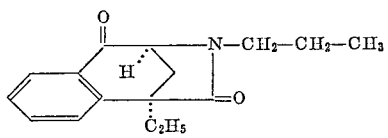

in the form of a bottle green oil. The compound is further purified by distillation in a high vacuum. This yields a yellow-green oil boiling at 145 to 160° C. under a pressure of 0.06 millimeter of mercury.

The 1-ethyl-3-bromo-4-oxo-1:2:3:4-tetrahydronaphthalene-1-carboxylic acid-n-butylamide used as starting material for the ring closure can be prepared as follows:

217 grams (1.0 mol) of 1-ethyl-4-oxo-1:2:3:4-tetrahydronapthalene-1-carboxylic acid amide are boiled under reflux for 15 hours with 600 milliliters of glacial acetic acid and 600 milliliters of concentrated hydrochloric acid. The batch is evaporated in a water-jet vacuum, the residue is dissolved in chloroform and the solution is washed well with water. It is dried over sodium sulfate, evaporated, and the residue is recrystallized from a mixture of ether and petroleum ether. 1-ethyl-4-oxo-1:2:3:4-tetrahydronaphthalene-1-carboxylic acid melting at 100 to 102° C. is thus obtained.

21.8 grams (0.1 mol) of this acid are suspended in 40 milliliters of absolute benzene, and 21.0 grams (0.1 mol) of phosphorus pentachloride are added to this suspension in portions. When the reaction has subsided, the batch is evaporated at 60° C. in a water-jet vacuum. The residue is dissolved in 60 milliliters of benzene and then evaporated to yield 1-ethyl-4-oxo-1:2:3:4-tetrahydronaphthalene-1-carboxylic acid chloride in the form of a pale yellow oil.

This acid chloride is dissolved in 150 milliliters of methylene chloride, and a solution of 7.5 grams (0.103 mol) of n-butylamine in 50 milliliters of methylene chloride are added dropwise while cooling with ice. The batch is then boiled for 1 hour under reflux. The methylene chloride solution is cooled, extracted twice with 50 milliliters of ice-cold 2 N hydrochloric acid each time and then twice with the same amount of water. The organic phase is dried over sodium sulfate and evaporated. 1-ethyl-4-oxo-1:2:3:4-tetrahydronaphthalene-1-carboxylic acid-n-butylamide are obtained in the form of pale yellow oil.

This amide is dissolved in 60 milliliters of glacial acetic acid, and then 16.0 grams (0.1 mol) of bromine are added dropwise at 20° C. The bromine is consumed immediately. The batch is evaporated in a water-jet vacuum at a temperature not exceeding 50° C. to yield 1-ethyl-3-bromo-4-oxo-1:2:3:4-tetrahydronaphthalene-1-carboxylic acid-n-butylamide in the form of a pale yellow oil that can be used directly for the ring closure with sodium methylate.

Example 6

53.75 grams (0.25 mol) of 1-ethyl-2:5-dioxo-2:3:4:5-tetrahydro-1:4-methano-1H-3-benzazepine are added to a suspension of 15 grams (0.38 mol) of finely pulverized sodium amide in 500 milliliters of toluene and the whole is heated under reflux while stirring until the evolution of ammonia is practically finished (about 2 to 4 hours). The contents of the flask are cooled to 10° C., and 43 grams (0.38 mol) of methyl iodide are allowed to flow in all at once. The batch is stirred at room temperature for 4 hours, and the reaction is completed by boiling for 8 hours under reflux. The reaction mixture is cooled, 20 milliliters of methanol are added dropwise and then, after a certain period of time, 200 milliliters of water are added. The toluene layer is separated in a separating funnel and again washed with 50 milliliters of water. The aqueous phase is extracted once with methylene chloride, and the methylene chloride solution is washed with water until the washings run neutral. The united organic extracts are dried over anhydrous sodium sulfate and evaporated. When recrystallized from a mixture of ethyl acetate and petroleum ether, the oily residue yields slightly yellowish crystals of 1 - ethyl - 3 - methyl-2:5-dioxo-2:3:4:5-tetrahydro-1:4-methano-1H-3-benzazepine of the formula

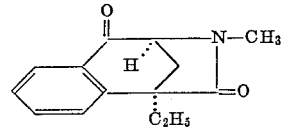

melting at 126 to 128° C. Recrystallization from ethyl acetate yields colorless cubes melting at 130 to 131° C.

Example 7

30 grams (0.14 mol) of 1-ethyl-2:5-dioxo-2:3:4:5-tetrahydro-1:4-methano-1H-3-benzazepine are added to a suspension of 8.3 grams (0.213 mol) of sodium amide in 350 milliliters of absolute dioxane, and the whole is heated for 2 hours under reflux. The batch is cooled to 10° C., and 32.7 grams (0.21 mol) of ethyl iodide are allowed to flow in. The batch is then stirred for 5 hours at room temperature and subsequently for 10 hours at the boil. After cooling the reaction mixture, the excess sodium amide is decomposed with 50 milliliters of methanol and, after a short time, 500 milliliters of water are added. The batch is then extracted with chloroform, and the chloroform extracts are washed with water. After drying over anhydrous sodium sulfate, the extracts are evaporated in a water-jet vacuum, and the dark-colored oil that remain is distilled in a high vacuum. The 1:3-diethyl-2:5-dioxo-2:3:4:5-tetrahydro-1:4-methano-1H-3-benzazepine of the formula

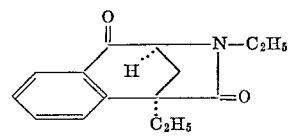

distilled as a colorless oil at 145 to 160° C. under a pressure of 0.1 millimeter of mercury.

Example 8

When 30 grams (0.14 mol) of 1-ethyl-2:5-dioxo-2:3:4:5-tetrahydro-1:4-methano-1H-3-benzazepine are reacted with 51 grams (0.277 mol) of n-butyl iodide in a manner analogous to that in Example 7, 1-ethyl-3-(n-butyl)-2:5-dioxo-2:3:4:5-tetrahydro - 1:4-methano - 1H - 3-benzazepine of the formula

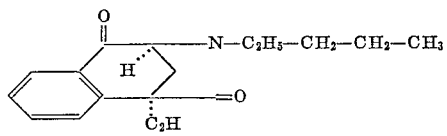

is obtained in the form of a yellowish viscous oil boiling at 155 to 165° C. under a pressure of 0.06 millimeter of mercury.

According to its infra-red spectrum and ultra-violet spectrum, the compound is identical with the product obtained in Example 5.

In an analogous manner 1-ethyl-3-isobutyl-2,5-dioxo-2:3:4:5 - tetrahydro-1,4-methano-1H-3-benzazepine may be obtained.

Example 9

21.5 grams (0.1 mol) of 1-ethyl-2:5-dioxo-2:3:4:5-tetrahydro-1:4-methano-1H-3-benzazepine are added to a suspension of 5.9 grams (0.15 mol) of sodium amide in 250 milliliters of dioxane, and the whole is stirred vigorously for 2 hours under reflux. The batch is cooled to 10° C., and 25.6 grams (0.15 mol) of benzylbromide are added dropwise. The batch is stirred for 2 hours at room temperature and then for 8 hours at the boil. Working up is then carried out in the manner described in Examples 7 and 8. Distillation of the viscous oil obtained in a high vacuum yields 1-ethyl-3-benzyl-2:5-dioxo-2:3:4:5-tetrahydro-1:4-methano-1H-3-benzazepine of the formula

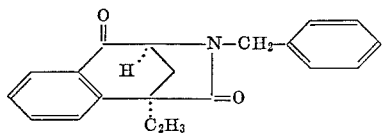

in the form of a viscous oil boiling at 185 to 191° C. under a pressure of 0.08 millimeter of mercury; to oil solidifies to a crystalline mass after a certain period.

Recrystallization of a test portion from a mixture of ether and petroleum ether yields colorless crystals melting at 111 to 113° C.

Example 10

40 grams (0.152 mol) of 1-phenyl-2:5-dioxo-2:3:4:5 - tetrahydro - 1:4methano-1H-3-benzazepine and 8.9 grams (0.228 mol) of finely pulverized sodium amide are boiled for 3 hours under reflux in 900 milliliters of absolute dioxane. The contents of the flask are cooled to 10° C., and 43.0 grams (0.3 mol) of methyliodide are added dropwise. The cooling ice is removed and the reaction mixture is stirred for 6 hours at room temperature. It is then boiled for 12 hours under reflux. After cooling the reaction mixture, 40 milliliters of methanol are allowed to flow in, the sodium iodide is isolated by suction filtration and the filtrate is evaporated. The residue is dissolved in 250 milliliters of chloroform and extracted twice with 50 milliliters of water. The chloroform solution is dried over sodium sulfate and evaporated. When recrystallized from a mixture of ethyl ester and petroleum ether, the crystalline residue yields 1-phenyl-2:5-dioxo-3-methyl - 2:3:4:5-tetrahydro-1:4-methano-1H-3-benzazepine of the formula

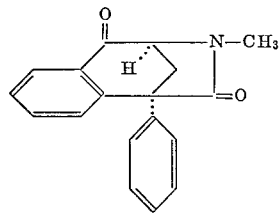

in the form of colorless coarse cubes melting at 138 to 140° C.

Example 11

30 grams (0.122 mol) of 1-ethyl-2:5-dioxo-8-methoxy-2:3:4:5-tetrahydro-1:4-methano-1H-3 - benzazepine and 7.15 grams (0.183 mol) of finely ground sodium amide are boiled under reflux for 4 hours in 500 milliliters of absolute dioxane. The batch is cooled to 10° C., and 26.1 grams (0.184 mol) of methyliodide are allowed to flow in. The batch is stirred for 4 hours at room temperature and is then heated for 10 hours at the boil. Working up, which is carried out in a manner analogous to that described in Example 10, yields 1-ethyl-2:5-dioxo-3-methyl - 8 - methoxy-2:3:4:5-tetrahydro-1:4-methano-1H-3-benzazepine of the formula

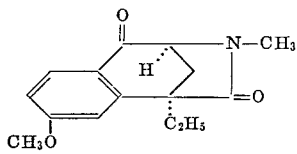

When recrystallized from a mixture of isopropanol and petroleum ether, the compound yields greenish cubes melting to 132 to 134° C.

Example 12

22.9 grams (0.1 mol) of 1-ethyl-3-methyl-2:5-dioxo-2:3:4:5 - tetrahydro-1:4-methano-1H-3-benzazepine are dissolved in 250 milliliters of ethanol and then catalytically hydrogenated in the presence of 0.5 gram of platinum oxide at atmospheric pressure and a temperature of 30° C. Hydrogenation ceases when 1 mol of hydrogen has been taken up. The batch is isolated from the catalyst by filtration and the filtrate is evaporated. Recrystallization from a mixture of ethyl acetate and petroleum ether yields 1 - ethyl-2-oxo-3-methyl-5β-hydroxy-2:3:4:5-tetrahydro-1:4-methano-1H-3-benzazepine of the formula

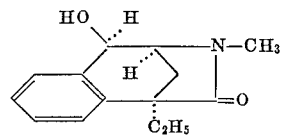

in the form of colorless crystals melting at 197 to 198° C., the yield being practically quantitative.

Example 13

When 24.3 grams (0.1 mol) of 1:3-diethyl-2:5-dioxo-2:3:4:5-tetrahydro-1:4 - methano-1H-3-benzazepine are hydrogenated in ethanol using platinum oxide as catalyst in a manner analogous to that described in Example 12, 1:3 - diethyl-2-oxo-5β-hydrovy-2:3:4:5-tetrahydro-1:4-methano-1H-3-benzazepine of the formula

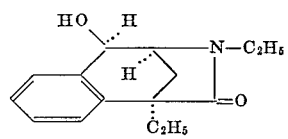

is obtained. Recrystallization from a mixture of ethyl acetate and acetone yields colorless crystals melting at 194 to 196° C.

Example 14

Catalytic hydrogenation of 1 - ethyl-3-(n-butyl)-2:5-dioxo - 2:3:4:5-tetrahydro-1:4-methano-1H-3-benzepine in fine spirit using platinum oxide by the method described in Example 12 produces 1-ethyl-2-oxo-3-(n-butyl)-5β - hydroxy-2:3:4:5-tetrahydro-1:4-methano-1H-3-benzazepine of the formula

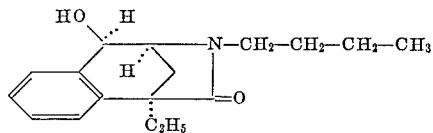

in 90% yield. When recrystallized from a mixture of ethylacetate and petroleum ether, the compound yields colorless flakes melting at 162 to 163° C.

Example 15

Catalytic hydrogenation of 1-ethyl-2:5-dioxo-3-benzyl-2:3:4:5 - tetrahydro - 1:4 - methano-1H-3-benzazepine in ethanol using platinum oxide by a method analogous to that described in Example 12 produces 1-ethyl-2-oxo-3-benzyl - 5β-hydroxy-2:3:4:5-tetrahydro-1:4-methano-1H-3-benzazepine of the formula

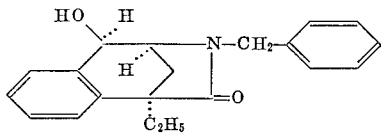

Recrystallization from a mixture of acetone and ether yields colorless crystals melting at 178 to 180° C.

Example 16

21.5 grams (0.1 mol) of 1-ethyl-2:5-dioxo-2:3:4:5-tetrahydro-1:4-methano-1H-3-benzazepine are suspended in 100 milliliters of methanol, and a solution of 3.8 grams (0.1 mol) of sodium boron hydride in 20 milliliters of water is added while agitating the flask. The 1-ethyl-2:5-dioxo - 2:3:4:5 - tetrahydro-1:4-methano-1H-3-benzazepine dissolves with vigorous evolution of foam. After 5 minutes, the reaction mixture is diluted with 300 milliliters of water, whereby 1-ethyl - 2 - oxo - 5β - hydroxy-2:3:4:5-tetrahydro-1:4-methano-1H-3-benzazepine of the formula

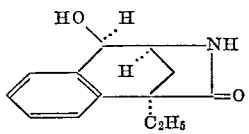

crystallizes out. After cooling the reaction mixture to 0° C., the product is isolated by suction filtration and 15.3 grams of colorless crystals melting at 225 to 235° C. are obtained. The product thus obtained is digested for 30 minutes in 50 milliliters of boiling methanol, and cooled in ice water. Filtration yields 12.3 grams of practically pure 1-ethyl-2-oxo-5β-hydroxy-2:3:4:5-tetrahydro-1:4-methano-1H-3-benzazepine melting at 241 to 244° C. According to its infra-red spectrum and thin-layer chromatogram, this product contains less than 5% of the 5α-isomer.

Extraction of the mother liquors of the reduction with chloroform and recrystallization from ethanol yields 3.7 grams of 1 - ethyl-2-oxo-5α-hydroxy-2:3:4:5-tetrahydro-1:4-methano-1H-3-benzazepine of the formula

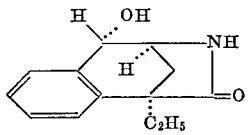

melting at 175 to 181° C. Its infra-red spectrum and thin-layer chromatogram show that the product is still contaminated with approximately 10 to 15% of the 5β-hydroxy compound.

Example 17

24.5 grams (0.1 mol) of 1-ethyl-2:5-dioxo-8-methoxy-2:3:4:5 - tetrahydro - 1:4-methano-1H-3-benzazepine are dissolved in 250 milliliters of fine spirit and catalytically hydrogenated at 38° C. under atmospheric pressure in the presence of 500 milligrams of platinum oxide. Hydrogenation ceases when 2150 milliliters (0.096 mol) of hydrogen have been taken up. The catalyst is removed by filtration and the solvent is evaporated in vacuo. When recrystallized from ethyl acetate, the amorphous residue yields 18.9 grams of 1 - ethyl - 2 - oxo - 5β - hydroxy - 8-methoxy - 2:3:4:5 - tetrahydro - 1:4-methano-1H-3-benzazepine of the formula

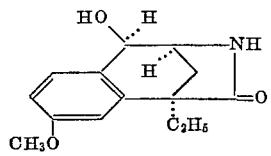

in the form of colorless crystals melting at 170 to 171° C.

3.8 grams of a mixture comprising the 5α-hydroxy compound and the 5β-hydroxy compound melting at 155 to 175° C. are obtained from the mother liquor of the recrystallization. By digesting this material in 20 milliliters of hot methanol, 1.15 grams of 1-ethyl-2-oxo-5α-hydroxy - 8 - methoxy-2:3:4:5-tetrahydro-1:4-methano-1H-3-benzazepine of the formula

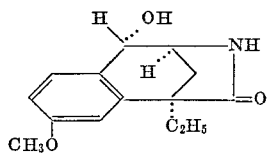

can be separated off; it is in the form of colorless flakes melting at 199 to 202° C.

Example 18

Reduction of 1 - ethyl - 2:5-dioxo-8-methoxy-2:3:4:5-tetrahydro - 1:4 - methano-1H-3-benzazepine with sodium boron hydride in methanol of 80% strength yield 1-ethyl-2 - oxo - 5β-hydroxy-8-methoxy-2:3:4:5-tetrahydro-1:4-methano-1H-3-benzazepine melting at 170 to 171° C. in 33% yield, and 1 - ethyl - 2-oxo-5α-hydroxy-8-methoxy-2:3:4:5-tetrahydro-1:4-methano-1H-3-benzazepine melting at 199 to 202° C. in 60% yield.

Example 19

3.9 grams (0.16 mol) of magnesium parings that have been pretreated with iodine vapour are covered with 50 milliliters of absolute ether and converted into the Grignard compound by the addition of 23 grams (0.146 mol) of bromobenzene. The Grignard solution is added dropwise, while stirring vigorously and cooling with ice water, to a solution of 30.5 grams (0.133 mol) of 1-ethyl-2:5 - dioxo - 3 - methyl-2:3:4:5-tetrahydro-1:4-methano-1H-3-benzazepine in 130 milliliters of absolute tetrahydrofuran and 210 milliliters of absolute ether. The mixture is then heated for 30 minutes at the boil. After cooling the reaction mixture, 130 milliliters of 2 N hydrochloric acid are added while stirring vigorously. 1-ethyl-2 - oxo - 3 - methyl-5β-hydroxy-5α-phenyl-2:3:4:5-tetrahydro-1:4-methano-1H-3-benzazepine of the formula

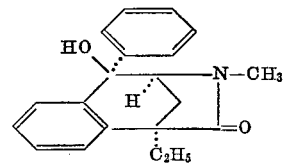

precipitates out in the form of crystals and can be isolated directly by suction filtration and washed with ether. It is purified by digestion in 80 milliliters of hot ethanol and then cooled to 0° C. 38.0 grams (93%) of colorless crystals melting at 236 to 238° C. are obtained. A test portion recrystallized from methanol yields crystals melting at 238 to 240° C. 1.9 grams of the product melting at 234 to 238° C. can be obtained from the original filtrate.

Example 20

When 11.45 grams (0.05 mol) of 1-ethyl-2:5-dioxo-3-methyl - 2:3:4:5 - tetrahydro-1:4-methano-1H-3-benzazepine are reacted under exactly the same conditions as those indicated in Example 19 with a Grignard solution prepared from 1.45 grams (0.06 mol) of magnesium and 10.9 grams (0.07 mol) of para-bromoanisole, 1-ethyl-2-oxo - 3 - methyl - 5β-hydroxy-5α-(para-methoxyphenyl)-2:3:4:5-tetrahydro-1:4-methano-1H-3-benzazepine of the formula

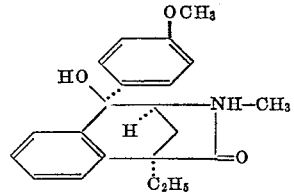

in the form of colorless crystals melting at 209 to 211° C. is obtained.

Example 21

A Grignard solution prepared by reacting 4 grams (0.166 mol) of magnesium parings with 23.4 grams (0.165 mol) of methyl iodide in 50 milliliters of absolute ether is added dropwise and while stirring vigorously to a solution of 31.5 grams (0.137 mol) of 1-ethyl-2:5-dioxo-3 - methyl - 2:3:4:5-tetrahydro-1:4-methano-1H-3-benzazepine in 120 milliliters of absolute tetrahydrofuran and 200 milliliters of absolute ether, which solution is cooled with ice water. The whole is then boiled for 30 minutes under reflux. After cooling the reaction mixture, 130 milliliters of 2 N hydrochloric acid are added, followed by 200 milliliters of chloroform. The aqueous layer is separated off and again extracted with chloroform. The united chloroform extracts, when evaporated, yield 33 grams of an oil from which 1-ethyl-2-oxo-3:5α-dimethyl - 5β - hydroxy-2:3:4:5-tetrahydro-1:4-methano-1H-3-benzazepine of the formula

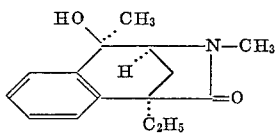

melting at 144 to 145° C. is obtained by digestion with ether. The mother liquor is evaporated, the residue is dissolved in a small amount of benzene and chromatographed on 200 grams of alumina (containing 2% of water). Elution with benzene yields 7.1 grams of starting product. Elution with chloroform gives a further 6.7 grams of 1 - ethyl - 2 - oxo - 3:5α-dimethyl-5β-hydroxy-2:3:4:5-tetrahydro-1:4-methano-1H-3-benzazepine.

Example 22

By reacting a solution of methyl magnesium iodide, prepared from 2.1 grams (0.087 mol) of magnesium and 12.5 grams (0.088 mol) of methyl iodide in 50 milliliters of absolute ether, with 14.7 grams (0.06 mol) of 1:3-diethyl - 2:5 - dioxo-2:3:4:5-tetrahydro-1:4-methano-1H-3-benzazepine in 50 milliliters of absolute tetrahydrofuran and 100 milliliters of absolute ether under the conditions described in Example 21, 18.9 grams of a crystalline, brownish product are obtained. This product is dissolved in a small amount of methylene chloride and filtered through 260 grams of alumina (containing 2% of water). The total eluate with methylene chloride yields 1:3 - diethyl - 2-oxo-5β-hydroxy-5α-methyl-2:3:4:5-tetrahydro-1:4-methano-1H-3-benzazepine of the formula

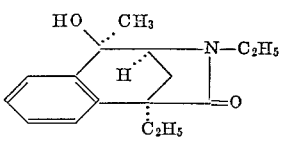

Colorless crystals melting at 175 to 176° C. are obtained by recrystallization from ethyl acetate.

Example 23

The reaction of 1-ethyl-2:5-dioxo-3-(n-butyl)-2:3:4:5-tetrahydro-1:4-methano-1H-3-benzazepine with methyl magnesium iodide under the same conditions as those described in Example 22, yields 1-ethyl-2-oxo-2-(n-butyl)-5β - hydroxy-5α-methyl-2:3:4:5-tetrahydro-1:4-methano-1H-3-benzazepine of the formula

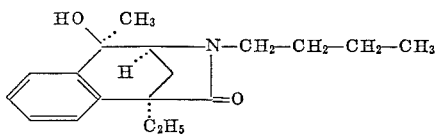

Recrystallization from a mixture of ether and petroleum ether yields colorless crystals melting at 116 to 118° C.

Example 24

Reaction between methyl magnesium iodide and 1 - ethyl - 2:5 - dioxo-3-benzyl-2:3:4:5-tetrahydro-1:4-methano-1H-3-benzazepine under the conditions described in Example 22 yields 1-ethyl-2-oxo-3-benzyl-5β-hydroxy-5α - methyl - 2:3:4:5-tetrahydro-1:4-methano-1H-3-benzazepine of the formula

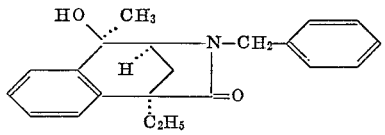

Recrystallization from ethyl acetate yields colorless crystals melting at 203 to 205° C.

Example 25

A solution of phenyl magnesium bromide, prepared by reacting 3.08 grams (0.128 mol) of magnesium parings with 19.6 grams (0.125 mol) of bromobenzene in 55 milliliters of absolute ether, is added dropwise while stirring and cooling with ice to a solution of 27.0 grams (0.104 mol) of 1-ethyl-2:5-dioxo-3-methyl-8-methoxy-2:3:4:5-tetrahydro-1:4-methano-1H-3-benzazepine in 120 milliliters of absolute tetrahydrofuran and 185 milliliters of absolute ether. The whole is boiled for ½ hour under reflux and then worked up in the manner described in Example 19. 1-ethyl-2-oxo-3-methyl-5β-hydroxy-5α-phenyl - 8 - methoxy - 2:3:4:5-tetrahydro-1:4-methano-1H-3-benzazepine of the formula

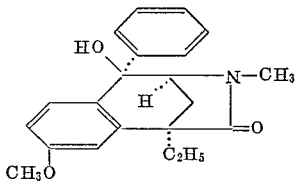

is obtained in the form of colorless crystals melting at 243 to 245° C.

Example 26

A solution of methyl magnesium iodide, prepared by reacting 2.1 grams (0.088 mol) of magnesium parings with 12.3 grams (0.087 mol) of methyl iodide in 30 milliliters of absolute ether is added dropwise, while cooling with ice, to a solution of 20 grams (0.072 mol) of 1-phenyl - 2:5-dioxo-3-methyl-2:3:4:5-tetrahydro-1:4-methano-1H-3-benzazepine in 50 milliliters of absolute tetrahydrofuran and 100 milliliters of absolute ether. The batch is then boiled under reflux for 30 minutes. After cooling the reaction mixture, 100 milliliters of 2 N hydrochloric acid are allowed to flow in, and the batch is extracted 3 times with 150 milliliters of chloroform each time. The combined chloroform extracts are washed with water, dried over sodium sulfate, and evaporated. When digested with ether, the residue yields 1-phenyl-2-oxo-3:5α - dimethyl - 5β - hydroxy-2:3:4:5-tetrahydro-1:4-methano-1H-3-benzazepine of the formula

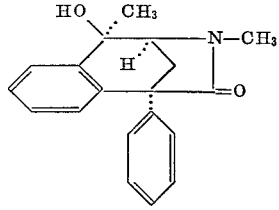

in the form of colorless crystals melting at 242 to 244° C. (with decomposition).

Example 27

23.1 grams (0.1 mol) of 1-ethyl-2-oxo-3-methyl-5β-hydroxy - 2:3:4:5-tetrahydro-1:4-methano-1H-3-benzazepine are dissolved in 125 milliliters of methylene chloride, 23.8 grams (0.2 mol) of thionyl chloride are added, and the whole is boiled for 6 hours under reflux. The clear solution is thoroughly evaporated in a water-jet vacuum. The residue is dissolved in 100 milliliters of ether and extracted twice with 30 milliliters of water. The solution

19 in ether is dried over anhydrous sodium sulfate and directly filtered through a column containing 50 grams of alumina (containing 2% of water). Elution with methylene chloride yields 1 - ethyl - 2-oxo-3-methyl-5-chloro-2:3:4:5-tetrahydro-1:4-methano-1H-3-benzazepine in the form of a colorless viscous oil that is used directly for the catalytic dechlorination (Example 31).

Example 28

21.7 grams (0.1 mol) of a mixture comprising 1-ethyl-2 - oxo-5α-hydroxy-2:3:4:5-tetrahydro-1:4-methano-1H-3-benzazepine and 1-ethyl-2-oxo-5β-hydroxy-2:3:4:5-tetrahydro-1:4-methano-1H - 3 - benzazepine (cf. Example 16), 80 milliliters of benzene and 20 milliliters of thionyl chloride are heated for 8 hours under reflux. The batch is evaporated in vacuo and the residue is digested in a mixture of ether and petroleum ether. 1-ethyl-2-oxo-5-chloro - 2:3:4:5 - tetrahydro-1:4-methano-1H-3-benzazepine is obtained in the form of colorless crystals melting at 160 to 180° C. The product is a mixture of the 5α-chlorine compound and the 5β-chlorine compound. This mixture can be catalytically dechlorinated directly (cf. Example 32).

Example 29

30 grams (0.121 mol) of 1-ethyl-2-oxo-5β-hydroxy-8 - methoxy - 2:3:4:5 - tetrahydro - 1:4 - methano - 1H-3-benzazepine are dissolved in 500 milliliters of methylene chloride. 100 grams of anhydrous calcium chloride are added to the solution. A moderate stream of dry hydrogen chloride is introduced at 25° C. in the course of 3 hours while stirring vigorously. Subsequently, stirring is continued for 8 hours at room temperature. The insoluble inorganic salts are separated off by suction filtration, and washing is carried out thoroughly with chloroform. The filtrate is extracted twice with 50 milliliters of water each time, dried over anhydrous sodium sulfate and evaporated. 1-ethyl-2-oxo-5-chloro-8 - methoxy - 2:3:4:5 - tetrahydro-1:4-methano-1H-3-benzazepine melting at 153 to 158° C. is thus obtained. (This material can be used directly for reduction with lithiumaluminum hydride.) Recrystallization of a test portion from a mixture of methylene chloride and ethyl acetate yields colorless crystals melting at 170 to 171° C. According to its infrared spectrum and mixed melting point, the substance is identical with the substance obtained in Example 30.

Example 30

13.5 grams (0.055 mol) of 1-ethyl-2-oxo-5α-hydroxy-8 - methoxy - 2:3:4:5 - tetrahydro - 1:4 - methano - 1H-3-benzazepine are dissolved in 50 milliliters of benzene, and this solution, together with 13.0 grams (0.11 mol) of thionyl chloride, is heated for 2 hours under reflux at the boil. The batch is then evaporated thoroughly in a water-jet vacuum. The residue, which comprises 20.0 grams of amber-colored oil having a pungent odor (its infra-red spectrum shows it to be the 5-chlorosulfinate), is dissolved in 200 milliliters of ether, and then 5 milliliters of water are cautiously added, while cooling with ice. This process is accompanied with the violent evolution of sulfur dioxide. At the same time, a product crystallizes out. The batch is allowed to stand for 2 hours at 25° C., whereupon the ether is evaporated off and the crystalline residue is dissolved in chloroform. The solution is extracted twice with water, dried over anhydrous sodium sulfate, and evaporated. Recrystallization of the residue from a mixture of ethyl acetate and ether yields 1 - ethyl - 2 - oxo - 5 - chloro - 8 - methoxy - 2:3:4:5-tetrahydro-1:4-methano-1H-3-benzazepine melting at 155 to 160° C.

Recrystallization from a mixture of chloroform and petroleum ether yields colorless crystals melting at 170 to 171° C. According to their infrared spectrum and mixed melting point, they are identical with the product obtained in Example 29, which melts at 170 to 171° C.

20

Example 31

27.7 grams (0.11 mol) of 1-ethyl-2-oxo-3-methyl-5-chloro-2:3:4:5-tetrahydro-1:4-methano-1H-3-benzazepine are dissolved in 250 milliliters of ethanol and hydrogenated at room temperature under atmospheric pressure in the presence of 1.2 grams of 10% palladium carbon. 1 mol of hydrogen is taken up after 32 hours and hydrogenation ceases.

The catalyst is separated off by filtration, the filtration is evaporated, and the residue is dissolved in ether. The solution is extracted with aqueous sodium bicarbonate solution and then with water, and the ethereal solution is dried over anhydrous sodium sulfate. After evaporation, the 1-ethyl-2-oxo-3-methyl-2:3:4:5-tetrahydro-1:4-methano-1H-3-benzazepine of the formula

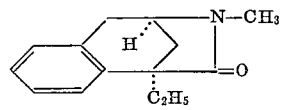

remains in the form of a colorless oil that rapidly crystallizes. Recrystallization from a mixture of ether and petroleum ether yields colorless flakes melting at 80 to 81° C.

Example 32

11.75 grams (0.05 mol) of a mixture of the stereoisomeric 1-ethyl-2-oxo-5-chloro-2:3:4:5 - tetrahydro-1:4-methano-1H-3-benzazepines are dissolved in 200 milliliters of ethanol, and hydrogenated at 40° C. under atmospheric pressure in the presence of 1 gram of 10% palladium carbon catalyst. If hydrogenation ceases prematurely, the contaminated catalyst must be replaced. After 1110 milliliters (99% of the amount required by theory) of hydrogen has been taken up, the batch is separated from the catalyst by filtration and evaporated in a water-jet vacuum. 10 grams of oil are obtained which yields 1-ethyl-2-oxo-2:3:4:5-tetrahydro-1:4-methano-1H-3-benzazepine of the formula

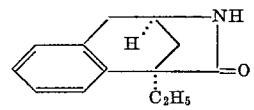

in the form of colorless crystals melting at 153 to 154° C. after recrystallization.

Example 33

21.7 grams (0.1 mol) of 1-ethyl-2-oxo-5β-hydroxy-2:3:4:5-tetrahydro - 1:4 - methano - 1H-3-benzazepine are dissolved in 300 milliliters of absolute tetrahydrofuran, and the solution is added dropwise in the course of 30 minutes and while stirring to a suspension of 8 grams (0.2 mol) of lithium-aluminum hydride in 200 milliliters of absolute tetrahydrofuran, which suspension is boiling under reflux. The reaction mixture is then boiled under reflux for a further 10 hours. After cooling the reaction mixture, 8 milliliters of water, 8 milliliters of aqueous sodium hydroxide solution of 15% strength and 24 milliliters of water are allowed to run in successively. The insoluble inorganic constituents are isolated by suction filtration and washed thoroughly with chloroform several times. The filtrate is evaporated, the residue is dissolved in 200 milliliters of 2 N hydrochloric acid and extracted twice with 50 milliliters of benzene each time. The aqueous hydrochloric acid phase is extracted with a small amount of active carbon, filtered, and then rendered alkaline with 5 N aqueous sodium hydroxide solution. The base that precipitates is extracted in the usual manner with methylene chloride, and 1-ethyl-5β-hydroxy-2:3:4:5-tetrahydro-1:4-methano-1H-3-benzazepine of the formula

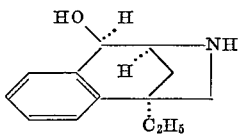

is obtained in the form of a yellowish oil. Recrystallization from ethyl acetate yields colorless crystals melting at 121 to 122° C.

After recrystallization from a mixture of ethanol and ether, the hydrochloride of the base melts at 179 to 180° C.

When the solution of the base in acetone is treated with a small excess of methane sulfonic acid, 1-ethyl-3-isopropylidene - 5β - hydroxy - 2:3:4:5 - tetrahydro - 1:4-methano-1H-3-benzazepinium-methane sulfonate of the formula

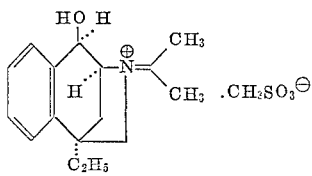

melting at 240 to 243° C. (with decomposition) crystallizes out. A test portion recrystallized from a mixture of acetone, ethanol and ether yields crystals melting at 241 to 243° C. (with decomposition).

As is to be expected, the above salt can easily be split by acid hydrolysis to yield the starting amine.

Example 34

When 23.1 grams (0.1 mol) of 1-ethyl-2-oxo-3-methyl-5β - hydroxy - 2:3:4:5 - tetrahydro - 1:4 - methano - 1H-3-benzazepine are reduced with 10 grams (0.25 mol) of lithium-aluminum hydride in tetrahydrofuran in the manner described in Example 33, 1-ethyl-3-methyl-5β-hydroxy - 2:3:4:5 - tetrahydro - 1:4 - methano - 1H - 3-benzazepine of the formula

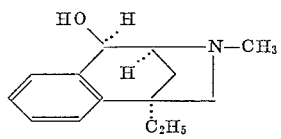

is obtained in the form of a colorless oil.

The hydrochloride crystallizes from a mixture of acetone and isopropanol in the form of colorless, moderately hygroscopic flakes melting at 180 to 181° C.

Example 35

When 1:3 - diethyl - 2 - oxo - 5β - hydroxy - 2:3:4:5-tetrahydro-1:4-methano-1H-3-benzazepine is reduced with lithium-aluminum hydride in tetrahydrofuran by the method described in Example 33, 1:3-diethyl-5β-hydroxy-2:3:4:5-tetrahydro-1:4-methano-1H-3-benzazepine of the formula

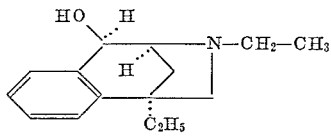

is isolated in the form of a pale yellow oil boiling at 103 to 109° C. under a pressure of 0.09 millimeter of mercury.

The base is dissolved in acetone and neutralized with the calculated amount of methane sulfonic acid. The methane sulfonate crystallizes out in the form of fine, colorless prisms melting at 185 to 187° C.

Example 36

Reduction of 1-ethyl-2-oxo-3-(n-butyl)-5β-hydroxy-2:3:4:5-tetrahydro-1H-3-benzazepine with lithium-aluminum hydride in tetrahydrofuran by the process described in Example 33 produces 1-ethyl-3-(n-butyl)-5β-hydroxy - 2:3:4:5 - tetrahydro - 1:4 - methano - 1H - 3-benzazepine of the formula

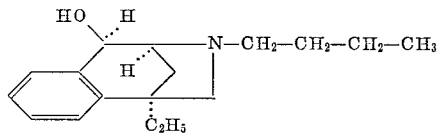

The base distills in a high vacuum as a pale yellow oil boiling at 122 to 130° C. under a pressure of 0.09 millimeter of mercury.

The hydrochloride crystallizes from acetone in the form of colorless flakes melting at 219 to 220° C.

Example 37

Reduction of 1-ethyl-2-oxo-3-benzyl-5β-hydroxy-2:3:4:5-tetrahydro-1:4-methano-1H-3-benzazepine with lithium-aluminum hydride in tetrahydrofuran by the process described in Example 33 yields 1-ethyl-3-benzyl-5β-hydroxy - 2:3:4:5 - tetrahydro - 1:4 - methano - 1H - 3-benzazepine of the formula

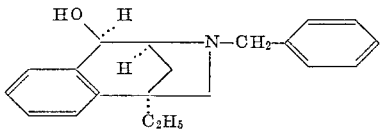

in the form of a viscous oil which can be directly converted into the hydrochloride. The hydrochloride crystallizes from acetone in the form of colorless crystals melting at 244 to 246° C.

Example 38

A solution of 24.5 grams (0.1 mol) of 1-ethyl-2-oxo-3:5 - dimethyl - 5β - hydroxy - 2:3:4:5 - tetrahydro - 1:4-methano-1H-3-benzazepine in 300 milliliters of absolute tetrahydrofuran is added dropwise in the course of 1 hour to a boiling suspension of 8 grams (0.2 mol) of lithium-aluminum hydride in 150 milliliters of absolute tetrahydrofuran while the said suspension is being vigorously agitated, and then boiling is continued for 10 hours under reflux. After cooling the reaction mixture, 8 milliliters of water, 8 milliliters of aqueous sodium hydroxide solution of 15% strength and 24 milliliters of water are allowed to run into the flask successively. The insoluble inorganic constituents are isolated by suction filtration and washed several times with warm chloroform. The filtrate is evaporated, the residue is dissolved in 200 milliliters of 2 N hydrochloric acid and then extracted twice with 50 milliliters of benzene. The aqueous hydrochloric acid phase is shaken with 0.5 gram of active carbon, filtered, rendered alkaline with sodium hydroxide solution, and the base that precipitates is extracted with chloroform. Evaporation yields 1-ethyl-3:5α-dimethyl-5β-hydroxy - 2:3:4:5 - tetrahydro - 1:4 - methano - 1H - 3-benzazepine of the formula

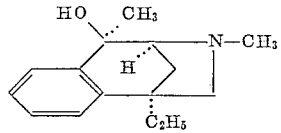

in the form of a yellow viscous oil.

10 grams of the base are dissolved in 50 milliliters of acetone and neutralized with hydrogen chloride in ethyl acetate. The hydrochloride (9.8 grams) crystallizes out on dilution with ethyl acetate, and melts at 230 to 231° C.

Example 39

60.2 grams (0.196 mol) of 1-ethyl-2-oxo-3-methyl-5β-hydroxy - 5α - phenyl - 2:3:4:5 - tetrahydro - 1:4 - methano-1H-3-benzazepine are dissolved in 250 milliliters of absolute tetrahydrofuran, and the solution is added dropwise to a boiling suspension of 21 grams (0.53 mole) of lithium-aluminum hydride in 200 milliliters of absolute tetrahydrofuran. After boiling for 10 hours under reflux, working up is carried out in the manner described in Example 38. The basic crude product is not taken up in hydrochloric acid however, but is dissolved in 100 milliliters of a 1:1 benzene/methylene chloride mixture, absorbed on an alumina column (containing 2% of water) and then exhaustively eluted with the same solvent mixture. An oil remains after the eluting agent has been evaporated off. 200 milliliters of petroleum ether are quickly added and the product is allowed to crystallize out. 1-ethyl - 3 - methyl - 5β - hydroxy - 5α - phenyl - 2:3:4:5-tetrahydro-1:4-methano-1H-3-benzazepine of the formula

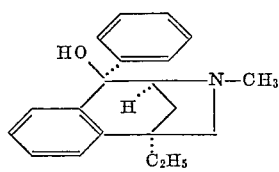

is thus obtained in the form of colorless granular crystals melting at 118 to 119° C.

After recrystallization from a mixture of methanol and ether, the hydrochloride melts at 283 to 284° C. (with decomposition).

Example 40

Reduction of 1-ethyl-2-oxo-3-methyl-5β-hydroxy-5α-(para - methoxy - phenyl) - 2:3:4:5 - tetrahydro - 1:4-methano-1H-3-benzazepine with lithium-aluminum hydride by the process described in Example 39, yields 1-ethyl - 3 - methyl - 5β - hydroxy - 5α - (para - methoxyphenyl) - 2:3:4:5 - tetrahydro - 1:4 - methano - 1H - 3-benzazepine of the formula

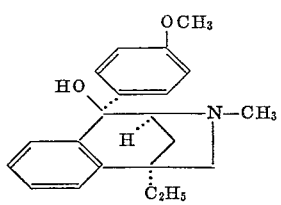

in the form of colorless flakes. After recrystallization from a mixture of benzene and petroleum ether, the compound melts at 105 to 106° C.

After recrystallization from a mixture of acetone and ether, the hydrochloride melts at 238 to 240° C. (with decomposition).

Example 41

Reduction of 1:3-diethyl-2-oxo-5β-hydroxy-5α-methyl-2:3:4:5 - tetrahydro - 1:4 - methano - 1H - 3 - benzazepine with lithium-aluminum hydride by the process described in Example 38 yields 1:3-diethyl-5β-hydroxy-5α-methyl-2:3:4:5-tetrahydro-1:4-methano-1H-3-benzazepine of the formula

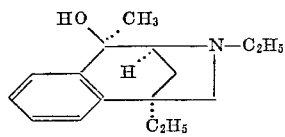

in the form of a colorless oil.

The hydrochloride, which is produced in the customary manner, melts at 208 to 209° C. after recrystallization from a mixture of acetone and ether.

Example 42

Reduction of 1-ethyl-2-oxo-3-(n-butyl)-5β-hydroxy-5α-methyl - 2:3:4:5 - tetrahydro - 1:4 - methano - 1H - 3-benzazepine by the method described in Example 38 yields 1 - ethyl - 3 - (n - butyl) - 5β - hydroxy - 5α - methyl - 2:3:4:5 - tetrahydro - 1:4 - methano - 1H - 3 - benzazepine of the formula

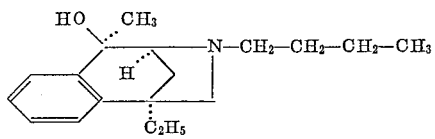

in the form of a yellow viscous oil.

The hydrochloride is obtained in the form of colorless crystals melting at 225 to 227° C. after recrystallization from a mixture of acetone and ethyl acetate.

Example 43

Reduction of 1-ethyl-2-oxo-3-benzyl-5β-hydroxy - 5α-methyl - 2:3:4:5 - tetrahydro - 1:4 - methano - 1H - 3-benzazepine with lithium-aluminum hydride by the process described in Example 38 yields 1-ethyl-3-benzyl-5β-hydroxy - 5α - methyl - 2:3:4:5 - tetrahydro - 1:4 - methano-1H-3-benzazepine of the formula

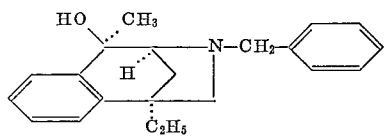

in the form of a pale yellow viscous oil.

After recrystallization from a mixture of acetone and ether, the hydrochloride is obtained in the form of a colorless crystal powder melting at 231 to 233° C.

Example 44

A solution of 5.6 grams (22.7 millimols) of 1-ethyl-2-oxo - 5β - hydroxy - 8 - methoxy - 2:3:4:5 - tetrahydro-1:4-methano-1H-3-benzazepine in 125 milliliters of absolute tetrahydrofuran is added dropwise to a boiling suspension of 2.5 grams (66.5 mmols) of lithium-aluminum hydride in 125 milliliters of absolute tetrahydrofuran. After boiling for 10 hours under reflux, working up is carried out in the manner described in Example 38. 1-ethyl-5β - hydroxy - 8 - methoxy - 2:3:4:5 - tetrahydro - 1:4-methano-1H-3-benzazepine of the formula

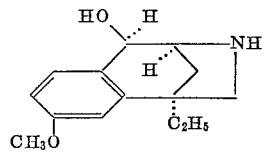

is obtained in the form of a colorless oil.

After recrystallization from acetone, the hydrochloride is obtained in the form of a colorless crystal powder melting at 147 to 148° C.

Example 45

A solution of 14.8 grams (0.056 mol) of 1-ethyl-2-oxo-5-chloro-8-methoxy - 2:3:4:5 - tetrahydro - 1:4-methano-1H-3-benzazepine in 300 milliliters of absolute tetrahydrofuran is added dropwise to a boiling suspension of 7.5 grams (0.19 mol) of lithium-aluminum hydride in 200 milliliters of absolute tetrahydrofuran. After boiling for 15 hours under reflux, working up is carried out in the manner described in Example 38. 1-ethyl-8-methoxy-2:3:4:5-tetrahydro-1:4-methano-1H-3-benzazepine of the formula

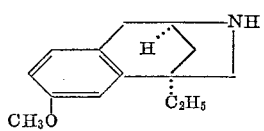

is thus obtained in the form of a colorless oil boiling at 116 to 119° C. under a pressure of 0.05 millimeter of mercury.

The hydrochloride crystallizes from a mixture of isopropanol and ether in the form of colorless needles melting at 171 to 172° C.

Example 46

11.9 grams (0.055 mol) of 1-ethyl-8-methoxy-2:3:4:5-tetrahydro-1:4-methano-1H-3-benzazepine are dissolved in 10 milliliters of formic acid of 98% strength, 4.5 milliliters (0.06 mol) of aqueous formalin (40% by volume) are added, and the whole is heated for 4 hours on a boiling water bath. The batch is evaporated in vacuo, the residue is taken up in 50 milliliters of 2 N hydrochloric acid, filtered through active carbon, and the filtrate is rendered alkaline with 5 N sodium hydroxide solution.

Extraction with chloroform and subsequent distillation of the chloroform residue yields 1-ethyl-3-methyl-8-methoxy - 2:3:4:5 - tetrahydro-1:4-methano-1H-3-benzazepine of the formula

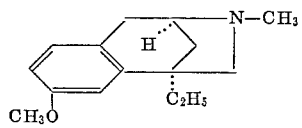

in the form of a colorless oil boiling at 108 to 110° C. under a pressure of 0.15 millimeter of mercury.

Example 47

A solution of 26.0 grams (0.077 mol) of 1-ethyl-2-oxo-3-methyl - 5β - hydroxy - 5α - phenyl-8-methoxy-2:3:4:5-tetrahydro-1:4-methano-1H-3-benzazepine in 650 milliliters of absolute tetrahydrofuran is added dropwise in the course of 1 hour to a boiling suspension of 7.3 grams (0.187 mol) of lithium-aluminum hydride in 100 milliliters of absolute tetrahydrofuran. Boiling is continued for a further 10 hours under reflux and then working up is carried out in the manner described in Example 38. 1-ethyl-3-methyl - 5β - hydroxy - 5α - phenyl-8-methoxy-2:3:4:5-tetrahydro-1:4-methano-1H-3-benzazepine of the formula

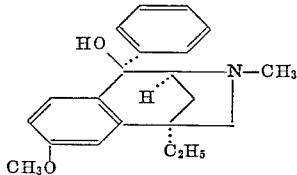

is obtained in the form of a yellow highly viscous oil.

The base is taken up in 100 milliliters of acetone and neutralized with a 2 N solution of hydrogen chloride in ethyl acetate. The hydrochloride crystallizes out in the form of colorless crystals melting at 229 to 230° C.

Example 48

19.0 grams (0.065 mol) of 1-phenyl-2-oxo-3:5α-dimethyl - 5β - hydroxy - 2:3:4:5-tetrahydro-1:4-methano-1H-3-benzazepine are dissolved in 500 milliliters of absolute tetrahydrofuran, and the solution is added dropwise in the course of 30 minutes to a boiling suspension of 6.2 grams (0.16 mol) of lithium-aluminum hydride in 100 milliliters of absolute tetrahydrofuran. Boiling is carried out under reflux for 15 hours and then working up is carried out in the manner described in Example 38.

This process yields 1 - phenyl - 2:5α - dimethyl-5β-hydroxy-2:3:4:5-tetrahydro - 1:4 - methano-1H-3-benzazepine of the formula

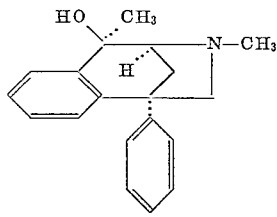

Recrystallization from ethyl acetate yields colorless crystals melting at 167 to 168° C. After recrystallization from a mixture of methanol and ether, the hydrochloride melts at 275° C. (with decomposition).

Example 49

A solution of 8.3 grams (0.032 mol) of 1-ethyl-2:5-dioxo - 3-(n-butyl)-2:3:4:5-tetrahydro-1:4-methano-1H-3-benzazepine in 100 milliliters of absolute tetrahydrofuran is added dropwise to a suspension of 3.1 grams (0.08 mol) of lithium-aluminum hydride in 100 milliliters of absolute tetrahydrofuran, which suspension is being boiled under reflux. Boiling is continued for a further 20 hours. Working up in the manner descrbied in Example 38 yields 1-ethyl - 3 - (n-buytl)-5β-hydroxy-2:3:4:5-tetrahydro-1:4-methano-1H-3-benzazepine of the formula

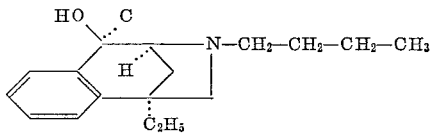

in the form of a pale yellow oil boiling at 124 to 128° C. under a pressure of 0.09 millimeter of mercury.

After recrystallization from acetone, the hydrochloride melts at 219 to 220° C. and is identical with the hydrochloride indicated in Example 36 and having the same melting point.

In an analogous manner 1-ethyl-3-isobutyl-5β-hydroxy-2:3:4:5-tetrahydro-1:4-methano-1H-3-benzazepine hydrochloride melting at 200 to 204° C. may be obtained.

Example 50

6.5 grams (0.022 mol) of 1-ethyl-3-(n-butyl)-5β-hydroxy - 2:3:4:5 - tetrahydro-1:4-methano-1H-3-benzazepine hydrochloride, 40 milliliters of acetic anhydride and 5 milliliters of an hydrous pyridine are heated for 1 hour on a water bath. A clear solution is quickly obtained. The batch is evaporated in a water-jet vacuum, the residue is taken up in chloroform and then extracted successively with sodium bicarbonate and water. The chloroform solution is dried over sodium sulfate and then evaporated to yield 1 - ethyl-3-(n-butyl-5β-acetoxy-2:3:4:5-tetrahydro-1:4-methano-1H-3-benzazepine of the formula

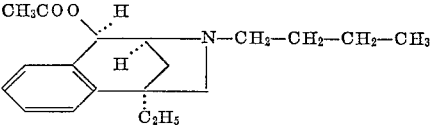

in the form of a yellow oil.

The hydrochloride crystallizes from a mixture of ethyl acetate and ether in the form of colorless cubes melting at 168 to 169° C.

In an analogous manner from 1,3-diethyl-5β-hydroxy-2:3:4:5 - tetrahydro-1:4-methano-1H-3-benzazepine hydrochloride and propionic acid chloride there may be obtained 1,3 - diethyl-5β-propionyloxy-2:3:4:5-tetrahydro-1:4-methano-1H-3-benzazepine hydrochloride.

Example 51

21.5 grams (0.1 mol) of 1-ethyl-2-oxo-3-methyl-2:3:4:5-tetrahydro-1:4-methano-1H-3-benzazepine are dissolved in 150 mols of absolute tetrahydrofuran, and the solution is added dropwise to a boiling suspension of 8 grams (0.2 mol) of lithium-aluminum hydride in 150 milliliters of absolute tetrahydrofuran. After boiling for 10 hours under reflux, working up is carried out in the manner described in Example 38. 1-ethyl-3-methyl-2:3:4:5-tetrahydro-1:4-methano-1H-3-benzazepine of the formula

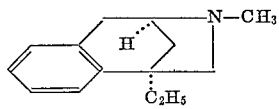

is thus obtained in the form of a colorless oil boiling at 75 to 82° C. under a pressure of 0.04 millimeter of mercury.

After recrystallization from acetone, the hydrochloride melts at 142 to 143° C.

Example 52

25 grams (0.1 mol) of 1-ethyl-2-oxo-3-methyl-5-chloro-2:3:4:5-tetrahydro-1:4-methano-1H-3-benzazepine are dissolved in 250 milliliters of absolute tetrahydrofuran, and the solution is added dropwise in the course of 1 hour to a boiling suspension of 10 grams (0.25 mol) of lithium-aluminum hydride in 300 milliliters of absolute tetrahydrofuran. Boiling is continued under reflux for 15 hours and then working up is carried out in the manner described in Example 38. This process directly yields 1-ethyl-3-methyl - 2:3:4:5-tetrahydro-1:4-methano-1H-3-benzazepine of the formula

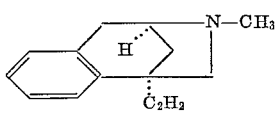

The hydrochloride crystallizes from acetone in the form of colorless crystals melting at 142 to 143° C. and is identical with the hydrochloride of the same melting point that is described in Example 51.

Example 53

A solution of 20.1 grams (0.1 mol) of 1-ethyl-2-oxo-2:3:4:5-tetrahydro-1:4-methano-1H-3-benzazepine in 200 milliliters of absolute tetrahydrofuran is added dropwise in the course of 30 minutes to a boiling suspension of 6 grams (0.15 mol) of lithium-aluminum hydride in 200 milliliters of absolute tetrahydrofuran. Boiling is carried out for 10 hours, and working up in the manner described in Example 38 yields 1 - ethyl - 2:3:4:5-tetrahydro-1:4-methano-1H-3-benzazepine of the formula

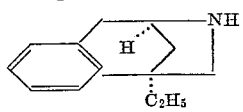

in the form of a colorless oil boiling at 89° C. under a pressure of 0.12 millimeter of mercury.

The hydrochloride crystallizes from a mixture of isopropanol and ether in the form of colorless crystals melting at 191 to 192° C.

The same product is obtained when 1-ethyl-2-oxo-5-chloro - 2:3:4:5-tetrahydro - 1:4 - methano - 1H - 3- benzazepine is reduced directly with lithium-aluminum hydride under the reaction conditions described in Example 52.

Example 54

8.0 grams (0.0233 mol) of 1-ethyl-3-benzyl-5β-hydroxy - 5α - methyl - 2:3:4:5 - tetrahydro - 1:4 - methano-1H-3-benzazepine hydrochloride are dissolved in 250 milliliters of rectified spirit and then catalytically debenzylated at 27° C. under atmospheric pressure in the presence of 1 gram of 10% palladium carbon. Hydrogenation ceases after 1 mol of hydrogen (522 milliliters) has been taken up. The catalyst is filtered off, the solvent is evaporated, and the residue is recrystallized from a mixture of ethanol and ether. 1-ethyl-5β-hydroxy-5α-methyl-2:3:4:5-tetrahydro-1:4-methano-1H-3-benzazepine hydrochloride of the formula

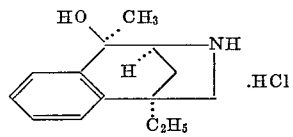

is obtained in the form of colorless crystals melting at 219 to 220° C.

Example 55

26.3 grams (0.1 mol) of 1-phenyl-2:5-dioxo-2:3:4:5-tetrahydro-1:4-methano-1H-3-benzazepine are hydrogenated in 400 milliliters of ethanol with 1.5 grams of platinum oxide at 25° C. under atmospheric pressure. 2.34 liters (0.1 mol) of hydrogen are taken up in the course of 1 hour, whereupon hydrogenation ceases. The catalyst is filtered off, the filtrate is evaporated and the residue is recrystallized from a mixture of ethyl acetate and petroleum ether. This yields 1-phenyl-2-oxo-5β-hydroxy-2:3:4:5-tetrahydro-1:4-methano-1H-3-benzazepine of the formula

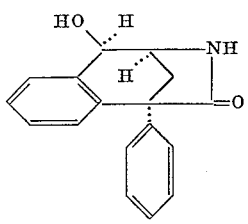

in the form of greenish crystals melting at 205° C.

The infra-red spectrum of the compound shows a broad band at about 3μ (associated hydroxyl bands) and a sharp band at 6.01μ (lactam grouping, hydrogen bridge between the 5β-hydroxyl group and the nitrogen of the lactam).

Example 56

2.63 grams (0.01 mol) of 1-phenyl-2:5-dioxo-2:3:4:5-tetrahydro-1:4-methano-1H-3-benzazepine are dissolved in 50 milliliters of methanol, and a solution of 0.78 gram (0.02 mol) of sodium boron hydride in 3 milliliters of water is added. When the evolution of hydrogen has subsided, the batch is slowly diluted with a total amount of 100 milliliters of water, whereby 1.32 grams (50%) of a colorless product melting at 215 to 225° C. crystallizes out. Recrystallization from a mixture of chloroform, ethanol and ether yields pure 1-phenyl-2-oxo-5α-hydroxy - 2:3:4:5 - tetrahydro - 1:4 - methano - 1H - 3- benzazepine of the formula

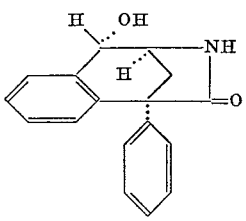

in the form of colorless cubes melting at 231 to 232° C. The infra-red spectrum of the compound shows bands at 2.81μ (unassociated hydroxyl group) and 5.86μ (five-membered lactam ring) and is quite different from the infra-red spectrum of the 5β-hydroxy-stereoisomer.

Example 57

26.5 grams (0.1 mol) of 1-phenyl-2-oxo-5β-hydroxy-2:3:4:5 - tetrahydro - 1:4 - methano - 1H - 3 - benzazepine, 30 milliliters of thionyl chloride and 50 milliliters of methylene chloride are boiled under reflux for 6 hours. The clear solution is evaporated, the residue is taken up in 100 milliliters of ether and allowed to stand in an open vessel. After a short time, sulfur dioxide begins to develop vigorously and the solution heats up to the boil. Colorless crystals precipitate out. After the evolution of sulfur dioxide has subsided, the batch is cooled to 0° C. and the product is filtered off. 16.3 grams of the stereoisomer I of 1-phenyl-2-oxo-5-chloro-2:3:4:5-tetrahydro-1:4-methano-1H-3-benzazepine of the formula

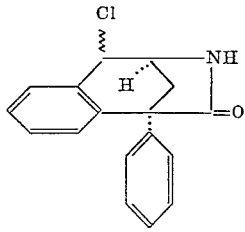

melting at 243 to 245° C. are obtained. A test portion recrystallized from a mixture of chloroform and ether yields colorless needles melting at 244 to 245° C.

2.8 grams of the stereoisomer II at 185 to 186° C. can be isolated from the mother liquor in acetone by concentration and dilution with ether. The infra-red spectra of the two stereoisomers differ distinctly from each other.

The two stereoisomers do not have to be separated for catalytic dehalogenation, since both lead to the same product.

Example 58

4.9 grams (0.0173 mol) of 1-phenyl-2-oxo-5-chloro-2:3:4:5-tetrahydro-1:4-methano-1H-3-benzazepine (stereoisomer I melting at 244 to 245° C.) are hydrogenated catalytically in 200 milliliters of ethanol at 42° C. with 1 gram of 10% palladium carbon under atmospheric pressure. 423 milliliters (0.0189 mol) of hydrogen are taken up in the course of 19 hours. The catalyst is filtered off while the batch is still hot. The palladium carbon is extracted 3 times with chloroform at the boil and under reflux. Evaporation of the combined filtrates yields 1-phenyl - 2 - oxo - 2:3:4:5 - tetrahydro - 1:4 - methano-1H-3-benzazepine of the formula

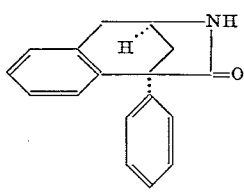

in the form of colorless crystals melting at 230 to 235° C. One recrystallization from isopropanol yields colorless prisms melting at 235 to 236° C.

Example 59

When 3.4 grams (0.012 mol) of 1-phenyl-2-oxo-5-chloro - 2:3:4:5 - tetrahydro - 1:4 - methano - 1H - 3 - benzazepine (stereoisomer II melting at 185 to 186° C.) are hydrogenated with 1.5 grams of 10% palladium carbon, the catalyst being added in 3 portions, a total of 280 milliliters (0.0125 mol) of hydrogen are taken up in the course of 25 hours (hydrogenation carried out at 45° C. under atmospheric pressure). The halogen-free substance that remains after extraction at the boil, separation of the catalyst and evaporation of the filtrate yields 1-phenyl-2-oxo - 2:3:4:5 - tetrahydro - 1:4 - methano - 1H - 3 - benzazepine of the formula

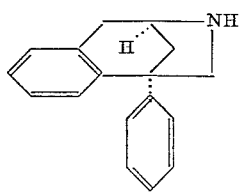

melting at 234 to 236° C. when digested with ether. The compound is identical in every respect with the compound described in Example 58.

Example 60

A solution of 8.7 grams (0.035 mol) of 1-phenyl-2-oxo-2:3:4:5-tetrahydro-1:4-methano-1H-3-benzazepine in 400 milliliters of absolute tetrahydrofuran is added dropwise in the course of 1 hour to a suspension of 4 grams (0.1 mol) of lithium-aluminum hydride in 150 milliliters of absolute tetrahydrofuran, which suspension is being boiled under reflux. Boiling is continued under reflux for a further 8 hours and while stirring.

After cooling the reaction mixture, 4 milliliters of water, 4 milliliters of sodium hydroxide solution of 15% strength and 12 milliliters of water are added successively. The insoluble constituents are isolated by suction filtration and washed well with chloroform. The filtrate is evaporated, and 50 milliliters of 2 N hydrochloric acid are added to the residue. 1-phenyl-2:3:4:5-tetrahydro-1:4-methano-1H-3-benzazepine hydrochloride of the formula

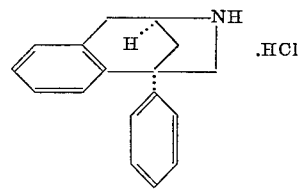

crystallizes out directly. It is isolated by suction filtration, washed with acetone and dried at 50° C. in a water-jet vacuum.

Colorless granular crystals melting at 321 to 323° C. (with decomposition) are thus obtained.

Example 61

6.0 grams (0.15 mol) of finely ground sodium amide are added to 24.9 grams (0.1 mol) of 1-phenyl-2-oxo-2:3:4:5-tetrahydro-1:4-methano-1H-3-benzazepine in 500 milliliters of absolute dioxane, and the whole is boiled under reflux for 2 hours. The reaction mixture is cooled to 10° C. and 20.2 grams (0.15 mol) of methyl iodide are allowed to run in one portion. The reaction mixture is stirred for 5 hours at 20° C. and is then boiled under reflux for 10 hours. The reaction mixture is cooled, 60 milliliters of methanol are added dropwise, and the undissolved inorganic salts are separated off by suction filtration. The filtrate is evaporated, the residue is dissolved in chloroform and extracted twice with water. After drying over anhydrous sodium sulfate and evaporation, the chloroform solution yields a yellowish, semi-crystalline oil which is recrystallized from a mixture of ethanol and ethyl acetate. This process yields 1-phenyl-2-oxo-3-methyl-2:3:4:5-tetrahydro - 1:4 - methano-1H-3-benzazepine of the formula melting at 159 to 161° C.

Example 62

10.5 grams (0.038 mol) of 1-phenyl-2:5-dioxo-3-methyl - 2:3:4:5 - tetrahydro-1:4-methano-1H-3-benzazepine are hydrogenated catalytically in 250 milliliters of rectified spirit at 36° C. under atmospheric pressure in the presence of 0.5 gram of platinum oxide. 878 milliliters (0.039 mol) of hydrogen are taken up in the course of 30 minutes. A portion of the product crystallizes out during this process. 200 milliliters of chloroform are added, the batch is heated to 50° C. and the catalyst is filtered off. Evaporation of the filtrate yields 1-phenyl-2-oxo-3-methyl-5β - hydroxy - 2:3:4:5 - tetrahydro-1:4-methano-1H-3-benzazepine of the formula

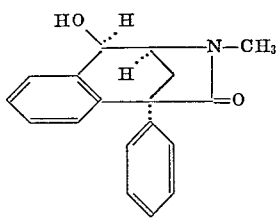

in the form of colorless crystals melting at 220 to 221° C. Recrystallization from a mixture of chloroform and ether yields colorless flakes melting at 221 to 222° C.

The hydrogenation proceeds practically stereospecifically.

Example 63

10.5 grams of 1-phenyl-2-oxo-3-methyl-5β-hydroxy-2:3:4:5-tetrahydro - 1:4 - methano-1H-3-benzazepine, 20 milliliters of thionyl chloride and 50 milliliters of methylene chloride are boiled under reflux for 6 hours. The batch is evaporated to dryness, the residue is dissolved in a small amount of ethyl acetate, a small amount of ether is added and the solution is allowed to stand overnight at 0° C. in an open reaction vessel. 1-phenyl-2-oxo-3 - methyl-5-chloro-2:3:4:5-tetrahydro-1:4-methano-1H-3-benzazepine of the formula

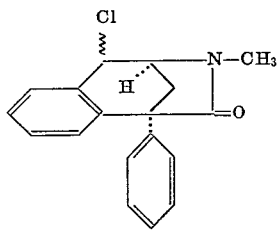

crystallizes out in the form of colorless prisms melting at 139 to 140° C. After recrystallization from a mixture of ethyl acetate and petroleum ether, the product melts at 140 to 141° C.

1.5 grams (M.P. 120 to 150° C.) of a mixture of a chlorine compound and starting material are obtained from the mother liquor on dilution with petroleum ether.

Example 64

2.98 grams (0.01 mol) of 1-phenyl-2-oxo-3-methyl-5-chloro - 2:3:4:5 - tetrahydro-1:4-methano-1H-3-benzazepine are hydrogenated catalytically in 100 milliliters of ethanol at 40° C. under atmospheric pressure in the presence of 0.5 gram of 10% palladium carbon. 253 milliliters (0.0113 mol) of hydrogen are taken up in the course of 2 hours; hydrogenation then ceases. The batch is filtered, the catalyst is extracted at the boil 3 times with 10 milliliters of chloroform, and the combined filtrates are evaporated. 1-phenyl-2-oxo-3-methyl - 2:3:4:5 - tetrahydro-1:4-methano-1H-3-benzazepine of the formula

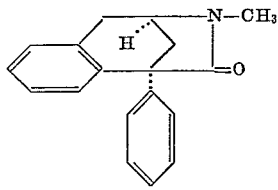

melting at 158 to 160° C. is thus obtained. Recrystallization from ethyl acetate yields colorless crystals melting at 160 to 161° C. According to its mixed melting point and infra-red spectrum, this compound is identical with the compound described in Example 61.

Example 65

A solution of 30 g. (0.117 mol) of 1-phenyl-2-oxo-5β-hydroxy - 2:3:4:5 - tetrahydro-1:4-methano-1H-3-benzazepine in 300 ml. of absolute tetrahydrofuran is added dropwise in the course of 30 minutes to a suspension, boiling under reflux, of 8 g. (0.2 mol) of lithium-aluminum hydride in 200 ml. of absolute tetrahydrofuran. The batch is refluxed for another 8 hours. Working up by the process described in Example 60 yields a colorless crystalline product which on being triturated with 80 ml. of ethyl acetate yields 1-phenyl - 5β - hydroxy-2:3:4:5-tetrahydro-1:4-methano-1H-3-benzazepine of the formula

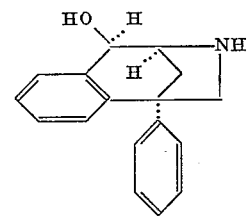

melting at 192 to 193° C.

The hydrochloride of this product, after being recrystallized from ethanol+ether, melts at 225 to 228° C. with evolution of gas.

Example 66

12 g. of finely ground potassium carbonate are added to a solution of 8.0 g. (31.5 mmols) of 1-phenyl-5β-hydroxy - 2:3:4:5-tetrahydro-1:4-methano-1H-3-benzazepine in 200 ml. of isopropanol, and the mixture cooled to 0 to 5° C. While stirring and cooling with ice water, 4.0 g. (66 mmols) of allyl bromide are added dropwise, and stirring continued overnight at 20° C. The inorganic salts are filtered off with suction, the filtrate evaporated under a water-jet vacuum, and the residue dissolved in methylene chloride. The resulting solution is extracted twice with water, dried over sodium sulfate, and the methylene chloride distilled off. The residual oil is crude 1-phenyl-3-allyl-5β - hydroxy - 2:3:4:5-tetrahydro-1:4-methano-1H-3-benzazepine of the formula

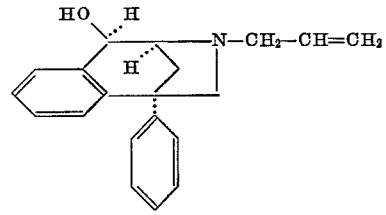

Example 67

10.4 g. of the crude 1-phenyl-3-allyl-5β-hydroxy-2:3:4: 5 - tetrahydro-1:4-methano-1H-benzazepine obtained according to Example 66 are heated on a water bath for 12 hours with 5 ml. of anhydrous pyridine and 20 ml. of acetic anhydride. The batch is then evaporated to dryness under a water-jet vacuum, the residue dissolved in methylene chloride, and the solution extracted first with aqueous sodium bicarbonate solution and then with water. There is obtained in this manner the 1-phenyl-3-allyl-5β-acetoxy - 2:3:4:5-tetrahydro-1:4-methano-1H-3-benzazepine of the formula

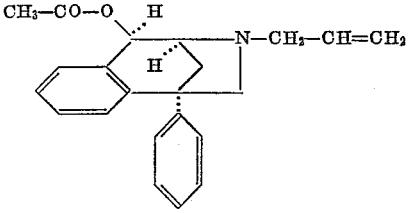

in the form of a yellowish oil.

To prepare the hydrochloride, 10.5 g. of the crude base are dissolved in 100 ml. of acetone, and the solution is neutralized with hydrogen chloride in ethyl acetate until a slightly acid reaction is attained. The 1-phenyl-3-allyl-5β - acetoxy-2:3:4:5-tetrahydro-1:4-methano-1H-3-benzazepine hydrochloride crystallized in the form of colorless needles melting at 180 to 181° C.

Example 68

13.2 g. (0.126 mol) of cyclopropanecarboxylic acid chloride are added dropwise, while cooling, to 13.8 g. (0.055 mol) of 1-phenyl-5β-hydroxy-2:3:4:5-tetrahydro-1:4 - methano-1H-3-benzazepine and 11.1 g. (0.11 mol) of triethylamine in 200 ml. of methylene chloride. The batch is left to itself for 12 hours at room temperature, then heated to the boil for 3 hours. After cooling, it is extracted with aqueous sodium bicarbonate, then with water, and the methylene chloride solution is dried over sodium sulfate. On evaporation a brown, viscous oil is obtained which is dissolved as it is in 150 ml. of absolute tetrahydrofuran and added dropwise to a boiling suspension of 6 g. (0.15 mol) of lithium aluminum hydride in 250 ml. of tetrahydrofuran. The batch is refluxed for 12 hours and worked up as described in Example 60 to obtain 1 - phenyl-3-(cyclopropyl-methyl)-5β-hydroxy-2:3:4:5 - tetrahydro-1:4-methanol-1H-3-benzazepine of the formula

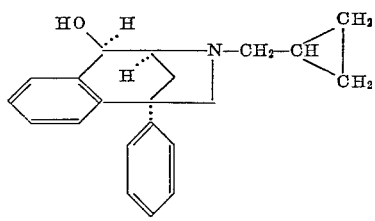

in the form of a pale yellow oil.

Example 69

A solution of 18.0 g. of the crude 1-phenyl-3-(cyclopropylmethyl) - 5β-hydroxy-2:3:4:5-tetrahydro-1:4-methano-1H-3-benzazepine in 10 ml. of pyridine and 200 ml. of methylene chloride is heated in a water bath with 40 ml. of acetic anhydride for 15 hours. The batch is then rapidly evaporated under a water-jet vacuum. The residue is dissolved in chloroform and the solution extracted by shaking first with aqueous sodium bicarbonate solution and then with water before it is dried over sodium sulfate. Evaporation of the solution yields 1-phenyl-3-(cyclopropylmethyl) - 5β-acetoxy-2:3:4:5-tetrahydro-1:4-methano-1H-3-benzazepine of the formula

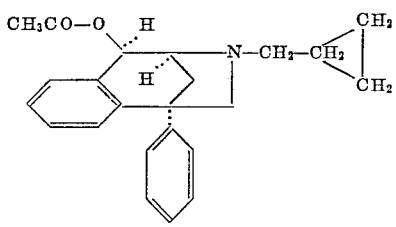

in the form of a viscous oil.

The base is dissolved in a small amount of ethanol, neutralized with hydrogen chloride in ethyl acetate, and diluted with ether. The 1-phenyl-3-(cyclopropylmethyl)-5β - acetoxy - 2:3:4:5-tetrahydro-1:4-methano-1H-3-benzazepine hydrochloride crystallizes in colorless needless melting at 171 to 173° C.

Example 70

A solution of 9.5 g. (0.04 mol) of 1-phenyl-2:3:4:5-tetrahydro 1:4-methano-1H-3-benzazepine in 200 ml. of isopropanol is treated with potassium carbonate and then, while stirring and cooling with ice, with 5.4 g. (0.44 mol) of allyl bromide. The batch is allowed to react for 1 hour at room temperature, then refluxed for 12 hours. After cooling, the inorganic matter is eliminated by filtration, and the filtrate evaporated. The residue is dissolved in chloroform and the solution thoroughly extracted by agitation with water. The extract is dried over sodium sulfate and the oil that remains behind distilled in a high vacuum. The 1 - phenyl - 3 - allyl - 2:3:4:5 - tetrahydro-1:4-methano-1H-3-benzazepine of the formula

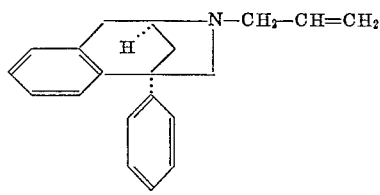

is a colorless oil boiling at 143 to 150° C. under a pressure of 0.05 mm. Hg.

When crystallized from a mixture of ethanol and ether, the 1 - phenyl - 3 - allyl - 2:3:4:5 - tetrahydro - 1:4-methano-1H-3-benzazepine hydrochloride forms colorless crystals melting at 227 to 228° C.

Example 71

At 20° C. a solution of 3.91 g. (0.0375 mol) of cyclopropanecarboxylic acid chloride in 25 ml. of methylene chloride is added dropwise to a solution of 8.0 g. (0.034 mol) of 1 - phenyl - 2:3:4:5 - tetrahydro - 1:4 - methano-1H-3-benzazepine and 7 ml. of triethylamine in 200 ml. of methylene chloride. The solution is heated in a water bath for 30 minutes, then cooled, and extracted by agitation with 50 ml. of 2 N-hydrochloric acid and with 2×50 ml. of water. The residue is dissolved in 100 ml. of absolute tetrahydrofuran and the solution stirred as it is into a boiling suspension of 4 g. of lithium aluminum hydride in 150 ml. of absolute tetrahydrofuran. The mixture is refluxed for 15 hours, then worked up as described in Example 60 to obtain 1 - phenyl - 3 - (cyclopropylmethyl)-2:3:4:5 - tetrahydro - 1:4 - methano - 1H - 3 - benzazpine of the formula

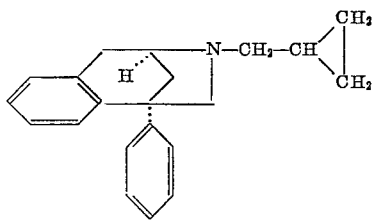

as a viscous oil.

The base is dissolved in acetone and the solution neutralized with hydrogen chloride in ethyl acetate to obtain 1 - phenyl - 3 - (cyclopropylmethyl) - 2:3.4:5 - tetrahydro - 1:4 - methano - 1H - 3 - benzazepine of melting point 231 to 232° C.

Example 72

A solution of 21.7 g. (0.1 mol) of 1-ethyl-3-methyl-5β - hydroxy - 2:3:4:5 - tetrahydro - 1:4 - methano - 1H-3-benzazepine in 100 ml. of benzene is treated with 14.2 g. (0.2 mol) of ethylisocyanate and with exclusion of moisture, refluxed for 15 hours. Rapid evaporation under a water-jet vacuum yields the 1-ethyl-3-methyl-5β-(ethylcarbamoyloxy) - 2:3:4:5 - tetrahydro-1:4-methano-1H-3-benzazepine of the formula

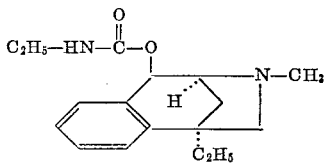

in the form of a viscous, colorless oil. The base is dissolved in acetone and the solution neutralized with hydrogen chloride in ethyl acetane to obtain the hydrochloride: colorless crystals of melting point 187 to 190° C.

Example 73

A solution of 11.75 g. (0.05 mol) of 1-phenyl-2:3:4:5-tetrahydro-1:4-methano-1H-3-benzazepine in 100 ml. of 98.5% formic acid is heated for 2 hours on a boiling water bath with 4.8 ml. of 40% formalin (0.06 mol). The solution is evaporated under reduced pressure, the residue dissolved in 150 ml. of methylene chloride, and the solution extracted, first with 100 ml. of N-sodium hydroxide solution, and then with 2×5 ml. of water. The methylene chloride solution is dried over sodium sulfate and the solvent evaporated. The brown-colored oil which remains behind is distilled under a high vacuum. The 1-phenyl - 3 - methyl - 2:3:4:5 - tetrahydro - 1:4 - methano-1H-3-benzazepine of the formula

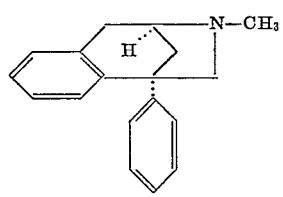

boils at 124 to 126° C. under a pressure of 0.08 mm. of Hg.

The 1 - phenyl - 3 - methyl - 2:3:4:5: - tetrahydro - 1:4-methano-1H-3-benzazepine methanesulfonte obtained by neutralizing an acetonic solution of the base with the calculate quantity of methane sulfonic acid crystallizes in the form of coarse prisms melting at 203° C.

Example 74

18.7 g. of (0.1 mol) of 1-ethyl-2:3:4:5-tetrahydro-1:4-methano-1H-3-benzazepine in 200 ml. of isopropanol are refluxed for 15 hours with vigorous stirring together with 50 g. of finely powdered potassium carbonate and 18.5 g. (0.1 mol) of β-phenylethylbromide. After cooling, the batch is filtered with the filtrate evaporated. The residue is heated for a short while with 50 ml. of acetic anhydride and the solution then evaporated.

The residue is dissolved in 300 ml. of N-hydrochloric acid and the solution extracted with 2×5 ml. of toluene. The acid aqueous phase is treated with a small amount of active carbon and then rendered alkaline with sodium hydroxide solution. Extraction with chloroform yields 1-ethyl - 3 - (β - phenylethyl) - 2:3:4:5 - tetrahydro - 1:4-methano-1H-3-benzazepine of the formula

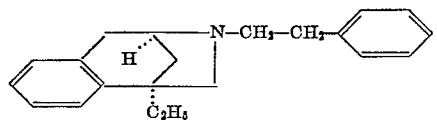

in the form of a colorless oil boiling at 175 to 183° C. under a pressure of 0.04 mm. of Hg.

From a mixture of methanol and ether, 1-ethyl-3-(β-phenylethyl) - 2:3:4:5 - tetrahydro - 1:4 - methano - 1H-3-benzazepine hydrochloride crystallizes in the form of colorless crystals of melting point 205 to 206° C.

Example 75

7.7 g. (0.033 ml.) of 1-ethyl-3-methyl-8-methoxy-2:3:4:5 - tetrahydro-1:4-methano-1H-3-benzazepine are heated at 120° C. for 15 hours in a 33% solution of hydrogen bromide in glacial acetic acid. The batch is rapidly evaporated under reduced pressure, and the reaction performed once more. The red reaction product is dissolved in 30 ml. of hot water, treated with active carbon, and filtered. An addition of aqueous ammonia precipitates the 1-ethyl-3-methyl-8-hydroxy-2:3:4:5-tetrahydro-1:4-methano-1H-3-benzazepine of the formula

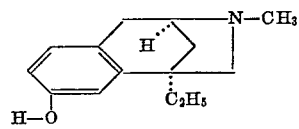

as flesh-colored crystals of melting point 195 to 210° C. One recrystallization from ethanol yields colorless prisms melting at 214 to 215° C.

The 1 - ethyl - 3 - methyl - 8 - hydroxy - 2:3:4:5-tetrahydro-1:4-methano-1H-3-benzazepine hydrochloride crystallizes from aqueous acetone only after being allowed to stand for several days. Beige-colored crystals melting at 230 to 235° C.

Example 76

2.17 g. (0.01 mol) of 1-ethyl-3-methyl-8-hydroxy-2:3:4:5 - tetrahydro - 1:4 - methano - 1H - 3 - benzazepine are heated on a boiling water bath for 3 hours with 2 ml. of pyridine and 20 ml. of acetic anhydride. The batch is evaporated under a water-jet vacuum, the residue dissolved in chloroform, and the solution extracted by agitation with aqueous ammonia solution and then with water. The chloroformic solution is dried and evaporated under reduced pressure, and the oil which remains behind neutralized in acetone with a solution of hydrogen chloride in ethyl acetate. The 1-ethyl-3-methyl-8-acetoxy-2:3:4:5 - tetrahydro - 1:4 - methano - 1H - 3 - benzazepine hydrochloride of the formula

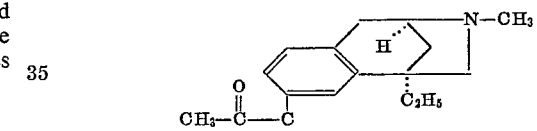

forms beige-colored crystals of melting point 225 to 226° C.

Example 77

While stirring, 14.5 g. (0.1 mol) of phenylacetyl chloride are added dropwise to a solution of 21.7 g. (0.1 mol) of 1 - ethyl - 8 - methoxy-2:3:4:5-tetrahydro-1:4-methano-1H-3-benzazepine in 15 ml. of triethylamine and 200 ml. of methylene chloride. The solution boils spontaneously. It is allowed to cool and then extracted by agitation with 50 ml. of N-hydrochloric acid and 2×50 ml. of water. The methylene chloride solution is dried over sodium sulfate before it is evaporated under reduced pressure. 32.7 g. of a pale yellow, viscous oil remain behind, and are dissolved without further manipulation in 200 ml. of absolute tetrahydrofuran and the solution added dropwise to a boiling solution of 6.0 g. (0.15 mol) of lithium aluminum hydride in 300 ml. of absolute tetrahydrofuran. After a boiling period of 12 hours, the batch is cooled and worked up as described in Example 60. A pale yellow oil is obtained which is fractionated in a high vacuum.

The 1 - ethyl - 3 - (β - phenylethyl) - 8 - methoxy-2:3:4:5 - tetrahydro - 1:4 - methano - 1H - 3 - benzazepine of the formula

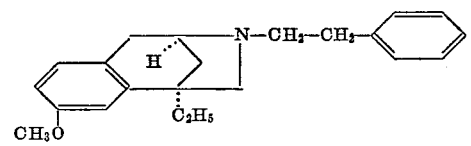

distills at 175 to 183° C. under a pressure of 0.04 mm. of Hg.

From acetone, the 1-ethyl-3-(β-phenylethyl) - 8 - methoxy-2:3:4:5-tetrahydro-1:4-methano-1H - 3 - benzazepine hydrochloride crystallizes in colorless cubes of melting point 195 to 196° C.

Example 78

6.42 g. (20 mmols) of 1-methyl-3-(β-phenylethyl)-8-methoxy - 2:3:4:5 - tetrahydro - 1:4 - methano - 1H -3-benzazepine in 100 ml. of a 33% solution of hydrogen bromide in glacial acetic acid are heated at 60° C. for 5 hours and then at 100 to 110° C. for 15 hours. The batch is evaporated and the operation repeated. There is obtained a red-brown oil which is dissolved in 50 ml. of water, treated with active carbon and then carefully rendered slightly alkaline with aqueous ammonia. The 1-ethyl - 3 - (β-phenylethyl)-8-hydroxy-2:3:4:5-tetrahydro-1:4-methano-1H-3-benzazepine of the formula

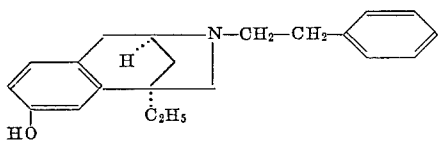

then crystallizes. Suction filtering and crystallization from a mixture of ethyl acetate and ether yield beige-colored crystals of melting point 169 to 171° C.

Example 79

At 20° C. a solution of 37.2 g. (0.1 mol) of 1-ethyl-3 - bromo - 4 - oxo - 1:2:3:4 - tetrahydronaphthalene - 1-carboxylic acid anilide in 150 ml. of absolute methanol are added dropwise to a solution of 9.2 g. (0.4 mol) of sodium in 150 ml. of absolute methanol. The reaction mixture heats up to 35° C. It is stirred for 1 hour, then slightly acidified by the addition of 160 ml. of 2 N-hydrochloric acid. The mixture is diluted with 300 ml. of water and extracted with chloroform. The oily product obtained is dissolved in 50 ml. of benzene and the solution filtered through 500 g. of alumina (activity II). The benzene eluates yield 1-ethyl-2,5-dioxo-3-phenyl-2:3:4:5-tetrahydro-1:4-methano-1H-3-benzazepine of the formula

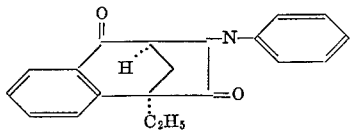

melting at 120 to 125° C. Recrystallization from a mixture of benzene and petroleum ether gives colorless crystals melting at 132 to 133° C.

The 1 - ethyl - 3 - bromo - 4 - oxo - 1:2:3:4 - tetrahydronaphthalene-1-carboxylic acid anilide used as starting material can be obtained as follows:

A solution of 23.7 g. (0.1 mol) 1-ethyl-4-oxo-1:2:3:4-tetrahydronaphthalene-1-carboxylic acid chloride (cf. Example 5) in 200 ml. of methylene chloride is treated dropwise with 18.6 g. (0.2 mol) of aniline. The mixture is allowed to stand at 40° C. for 30 minutes, cooled to 10° C., and extracted with 2×50 ml. of 2 N-hydrochloric acid and 2×50 ml. of water. The methylene chloride solution is dried over sodium sulfate and evaporated. On recrystallization of the residue from ethyl acetate, 1-ethyl - 4 - oxo - 1:2:3:4 - tetrahydro - naphthalene - 1-carboxylic acid anilide is obtained in the form of colorless crystals of melting point 150 to 151° C.

14.15 g. (0.05 mol) of this anilide are dissolved in 100 ml. of hot glacial acetic acid and the solution treated at 50° C., while stirring, with 8.8 g. (0.055 mol) of bromine. The solution is evaporated to dryness to obtain 1-ethyl-3-bromo - 4 - oxo - 1:2:3:4 - tetrahydronaphthalene-1-carboxylic acid anilide in the form of a pale yellow, viscous oil which, as it is, is subjected to cyclization with sodium methylate.

Example 80

Tablets containing 10 mg. of 1-phenyl-3-methyl-2:3:4:5-tetrahydro-1:4-methano-1H-3-benzazepine methsulfonate and having the following composition can be prepared:

|   | Per tablet, mg. |
|---|---|
| 1 - phenyl - 3 - methyl - 2:3:4:5 - tetrahydro - 1:4-methano-1H-3-benzazepine methanesulfonate | 10.0 |
| Wheat starch | 40.0 |
| Lactose | 60.0 |
| Colloidal silicic acid | 5.0 |
| Arrowroot | 15.0 |
| Talc | 9.0 |
| Magnesium stearate | 1.0 |
|   | 140.0 |

PREPARATION

The 1 - phenyl - 3 - methyl - 2:3:4:5 - tetrahydro-1:4-methano-1H-3-benzazepine methanesulfonate is mixed with part of the wheat starch, and with lactose and colloidal silicic acid, and the mixture forced through a sieve. The remainder of the wheat starch is pasted on a water bath with the five-fold quantity of water, and the paste kneaded with the powder mixture until a slightly plastic mass is obtained.

The plastic mass is pressed through a sieve having a mesh width of 3 mm., then dried, and the dry granulate forced through a sieve. Arrowroot, talc and magnesium stearate are then admixed and the resulting mixture compressed into tablets weighing 140 mg. each.

What is claimed is:

1. A member selected from the group consisting of compounds of the formula

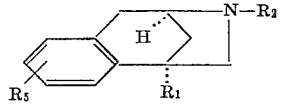

in which $R_1$ stands for lower alkyl, $R_2$ for lower alkyl and $R_5$ for lower alkanoyloxy and acid addition salts thereof.

2. A member selected from the group consisting of compounds of the formula

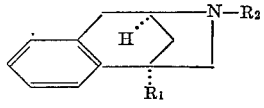

in which $R_1$ stands for phenyl and $R_2$ for lower alkyl, and acid addition salts thereof.

3. 1 - ethyl - 8 - methoxy - 2:3:4:5 - tetrahydro - 1:4-methano-1H-3-benzazepine.

4. 1 - ethyl - 3 - methyl - 8 - methoxy - 2:3:4:5 - tetrahydro-1:4-methano-1H-3-benzazepine.

5. 1 - ethyl - 3 - methyl - 2:3:4:5 - tetrahydro - 1:4-methano-1H-3-benzazepine.

6. 1 - ethyl - 2:3:4:5 - tetrahydro - 1:4 - methano - 1H-3-benzazepine.

7. 1 - phenyl - 2:3:4:5 - tetrahydro - 1:4 - methano-1H-3-benzazepine.

8. 1 - phenyl - 3 - allyl - 2:3:4:5 - tetrahydro - 1:4-methano-1H-3-benzazepine.

9. 1 - phenyl - 3 - (cyclopropylmethyl) - 2:3:4:5-tetrahydro-1:4-methano-1H-3-benzazepine.

10. 1 - phenyl - 3 - methyl - 2:3:4:5 - tetrahydro - 1:4-methano-1H-3-benzazepine.

11. 1 - ethyl - 3 - (β-phenylethyl) - 2:3:4:5 - tetrahydro-1:4-methano-1H-3-benzazepine.

12. 1 - ethyl - 3 - methyl - 8 - hydroxy - 2:3:4:5 - tetrahydro-1:4-methano-1H-3-benzazepine.

13. 1 - ethyl - 3 - methyl - 8 - acetoxy - 2:3:4:5 - tetrahydro-1:4-methano-1H-3-benzazepine.

14. 1 - ethyl - 3 - (β-phenylethyl) - 8 - methoxy-2:3:4:5-tetrahydro-1:4-methano-1H-3-benzazepine.

15. 1 - ethyl - 3 - (β-phenylethyl) - 8 - hydroxy-2:3:4:5-tetrahydro-1:4-methano-1H-3-benzazepine.

16. A member selected from the group consisting of compounds of the formula

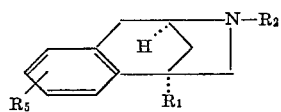

in which $R_1$ stands for lower alkyl, $R_2$ for a member selected from the group consisting of lower alkyl, lower alkenyl and phenyl-lower alkyl and $R_5$ for lower alkoxy, and acid addition salts thereof.

17. A member selected from the group consisting of compounds of the formula

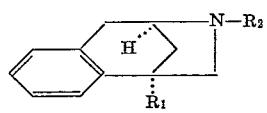

in which $R_1$ stands for phenyl and $R_2$ for a member selected from the group consisting of lower alkenyl, cyclo-lower alkyl-lower alkyl and for phenyl-lower alkyl, and acid addition salts thereof.

18. A member selected from the group consisting of compounds of the formula

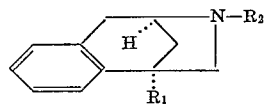

in which $R_1$ stands for lower alkyl and $R_2$ for a member selected from the group consisting of lower alkyl, lower alkenyl, cyclo-lower alkyl-lower alkyl and phenyl-lower alkyl, and acid addition salts thereof.

19. A member selected from the group consisting of compounds of the formula

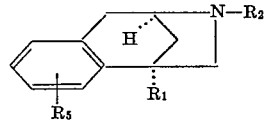

in which $R_1$ stands for a member selected from the group consisting of hydrogen, lower alkyl, phenyl, (lower alkyl)-phenyl, (lower alkoxy)-phenyl, (halogeno)-phenyl, (trifluoromethyl)-phenyl, phenyl-lower alkyl, (lower alkyl)-phenyl-lower alkyl, (lower alkoxy)-phenyl-lower alkyl, (halogeno)-phenyl-lower alkyl and (trifluoromethyl)-phenyl-lower alkyl, $R_2$ for a member selected from the group consisting of hydrogen, lower alkyl, cyclo-lower alkyl, cyclo-lower alkyl-lower alkyl, lower alkenyl, phenyl, (lower alkyl)-phenyl, (lower alkoxy)-phenyl, (halogeno)-phenyl, (trifluoromethyl)-phenyl, phenyl-lower alkyl, (lower alkyl)-phenyl-lower alkyl, (lower alkoxy)-phenyl-lower alkyl, (halogeno)-phenyl-lower alkyl and (trifluoromethyl)-phenyl-lower alkyl, and $R_5$ represents a member selected from the group consisting of hydrogen, lower alkyl, lower alkoxy, hydroxy, carbamoyloxy, lower alkylcarbamoyloxy, lower alkanoyloxy, benzoyloxy, halogen and trifluoromethyl, and acid addition salts thereof.

References Cited

FOREIGN PATENTS 822,506  10/1959  Great Britain.

NICHOLAS S. RIZZO, *Primary Examiner.*

ALEX MAZEL, *Examiner.*

JOSE TOVAR, *Assistant Examiner.*